US009999865B2

(12) United States Patent
Ichikawa et al.

(10) Patent No.: US 9,999,865 B2
(45) Date of Patent: *Jun. 19, 2018

(54) METHOD OF RELIABLE PARTICLE SIZE CONTROL FOR PREPARING AQUEOUS SUSPENSION OF PRECIOUS METAL NANOPARTICLES AND THE PRECIOUS METAL NANOPARTICLE SUSPENSION PREPARED BY THE METHOD THEREOF

(71) Applicant: IMRA America, Inc., Ann Arbor, MI (US)

(72) Inventors: Yuki Ichikawa, Nagoya Aichi (JP); Andrius Marcinkevicus, Saline, MI (US)

(73) Assignee: IMRA AMERICA, INC., Ann Arbor, MI (US)

(*) Notice: Subject to any disclaimer, the term of this patent is extended or adjusted under 35 U.S.C. 154(b) by 181 days.

This patent is subject to a terminal disclaimer.

(21) Appl. No.: 14/312,824

(22) Filed: Jun. 24, 2014

(65) Prior Publication Data

US 2014/0322138 A1    Oct. 30, 2014

Related U.S. Application Data

(63) Continuation of application No. PCT/US2014/016348, filed on Feb. 14, 2014.

(60) Provisional application No. 61/764,649, filed on Apr. 29, 2013.

(51) Int. Cl.
*B01J 13/00* (2006.01)
*B82Y 40/00* (2011.01)

(52) U.S. Cl.
CPC .......... *B01J 13/0043* (2013.01); *B82Y 40/00* (2013.01)

(58) Field of Classification Search
CPC combination set(s) only.
See application file for complete search history.

(56) References Cited

U.S. PATENT DOCUMENTS

| 4,764,271 | A | 8/1988 | Acosta | |
|---|---|---|---|---|
| 7,928,149 | B2 | 4/2011 | Watabe | |
| 2004/0102577 | A1* | 5/2004 | Hsu | B82Y 10/00 525/182 |
| 2012/0225021 | A1 | 9/2012 | Qian et al. | |
| 2012/0282134 | A1 | 11/2012 | Liu et al. | |

FOREIGN PATENT DOCUMENTS

| EP | 2045028 A1 | 4/2009 |
|---|---|---|
| WO | 2006071867 A2 | 7/2006 |

OTHER PUBLICATIONS

International Search Report, Two (2) Pages, dated Aug. 20, 2014.
Oh, Mi-Hyun, Effect of Conductivity of the Aqueous Solution on the Size of Printable Nanoparticle, Journal of Nanotechnology, vol. 2012 (2012) Article ID 467812.
Jang, Kyung-Deok, Effect of Lithium Ions on Copper Nanoparticle Size, Shape, and Distribution, Journal of Nanotechnology, vol. 2012 (2012) Article ID 469834.
Melendez, Rebeca G., On the Influence of Silver Nanopadicles Size in the Electrical Conductivity of PEDOT:PSS, Materials Science Forum vol. 644 (2010) pp. 85-90.
Amendola et al., Laser ablation synthesis in solution and size manipulation of noble metal nanoparticles, Physical Chem. Chem. Physics vol. 11, (2009) 3805-3821, first pub Apr. 1, 2009, DOI: 10.1039/b900654k.
Bell et al., SERS enhancement by aggregated Au colloids: effect of particle size, Physical Chemistry Chemical Physics vol. 11, 7455-7462, 2009.
Bonet et al., Synthesis of Monodisperse Au, Pt, Pd, Ru and Ir nanoparticles in ethylene glycol, NanoStructured Materials vol. 11, 8 pp. 1277-1284, 1999.
Brust et al., Synthesis of thiol-derivatised gold nanoparticles in a two-phase Liquid—Liquid system, J. Chem. Soc. Chem. Commun 1994 p. 801.
Darbouret et al., Ultrapure Water for Elemental Analysis down to ppt levels, ACTA Physica Polonica A vol. 116 Suppl. P S203 (2009).
DungDang et al., Synthesis and optical properties of copper nanoparticles prepared by a chemical reduction method, Adv. Nat. Sci.: Nanotechnology 2 (2011) 015009 (6pp).
Gros et al., Ionic composition of seawaters and derived saline solutions determined by ion chromatography, J. Chromatography A, 1210 (2008) 92-98.
S. J. Hurst et al., Maximizing DNA Loading on a Range of Gold Nanoparticle Sizes, Anal. Chem. 2006, 78, 8313-8318.
Kendall et al., Review: The Preparation of Conductivity Water. (J Chem Soc. p. 2460.
Kim et al., Synthesis of Monodisperse Palladium Nanoparticles, Nano Letters vol. 3, No. 9, 2003, pp. 1289-1291.
Long et al., The synthesis and characterization of platinum nanoparticles a method of controlling the size and morphology, Nanotechnology 21 (2010) 035605 doi:10.1088/0957-4484/21/3/035605.
S. Lou et al., "A gold nanoparticle-based immunochromatographic assay: The influence of nanoparticulate size" Analyst, 2012,137, 1174-1181.
Marin-Almazo et al., Synthesis and characterization of rhodium nanoparticles using HREM techniques, Microchemical Journal 81 (2005) 133-138.
Pashley et al., De-Gassed Water Is a Better Cleaning Agent, J. Phys. Chem B 2005, 109, 1231-1238 2005.

(Continued)

*Primary Examiner* — Robert S Cabral
(74) *Attorney, Agent, or Firm* — Dickinson Wright PLLC

(57) ABSTRACT

Disclosed is a method for making a colloidal suspension of precious metal nanoparticles. The method comprises providing a target material comprising a precious metal in a liquid dispersion medium in an ablation container. The dispersion medium has an electrical conductivity within a predetermined conductivity range. Laser pulses are used to generate the nanoparticles from the target in the container. While generating the nanoparticles the electrical conductivity of the dispersion medium is monitored and maintained within the predetermined range and thereby the generated nanoparticles are produced within a predetermined size range. The generated nanoparticles are used to form a colloidal suspension.

7 Claims, 14 Drawing Sheets

(56) References Cited

OTHER PUBLICATIONS

Perrault et al., Synthesis and Surface Modification of Highly Monodispersed, Spherical Gold Nanoparticles of 50-200 nm, JACS Communications, 131, 17042-17043 2009, published on Web Nov. 5, 2009.

Rehbock et al., Size control of laser-fabricated AuNP with highly diluted electrolytes and their subsequent bioconjugation, PCCP—Physical Chemistry Chemical Physics online—Oct. 3, 2012 DOI: 10.1039/C2CP42641B.

Solomon et al., Synthesis and Study of Silver Nanoparticles, Journal of Chemical Education vol. 84 No. 2 Feb. 2007 www.JCE.DivCHED.org.

Stamplecoskie et al., Optimal Size of Silver Nanoparticles for Surface-Enhanced Raman Spectroscopy, J Physical Chemistry C 2011, 115, 1403-1409.

J-P Sylvestre et al., Surface Chemistry of Gold nanoparticles Produced by laser Ablation in Aqueous Media, J. Phys. Chem. B 2004, 108, 16864-16869.

Turkevich et al., A study of the nucleation and growth processes in the synthesis of colloidal gold, Discussions of the Faraday Soc., 1951,11, 55-75.

* cited by examiner

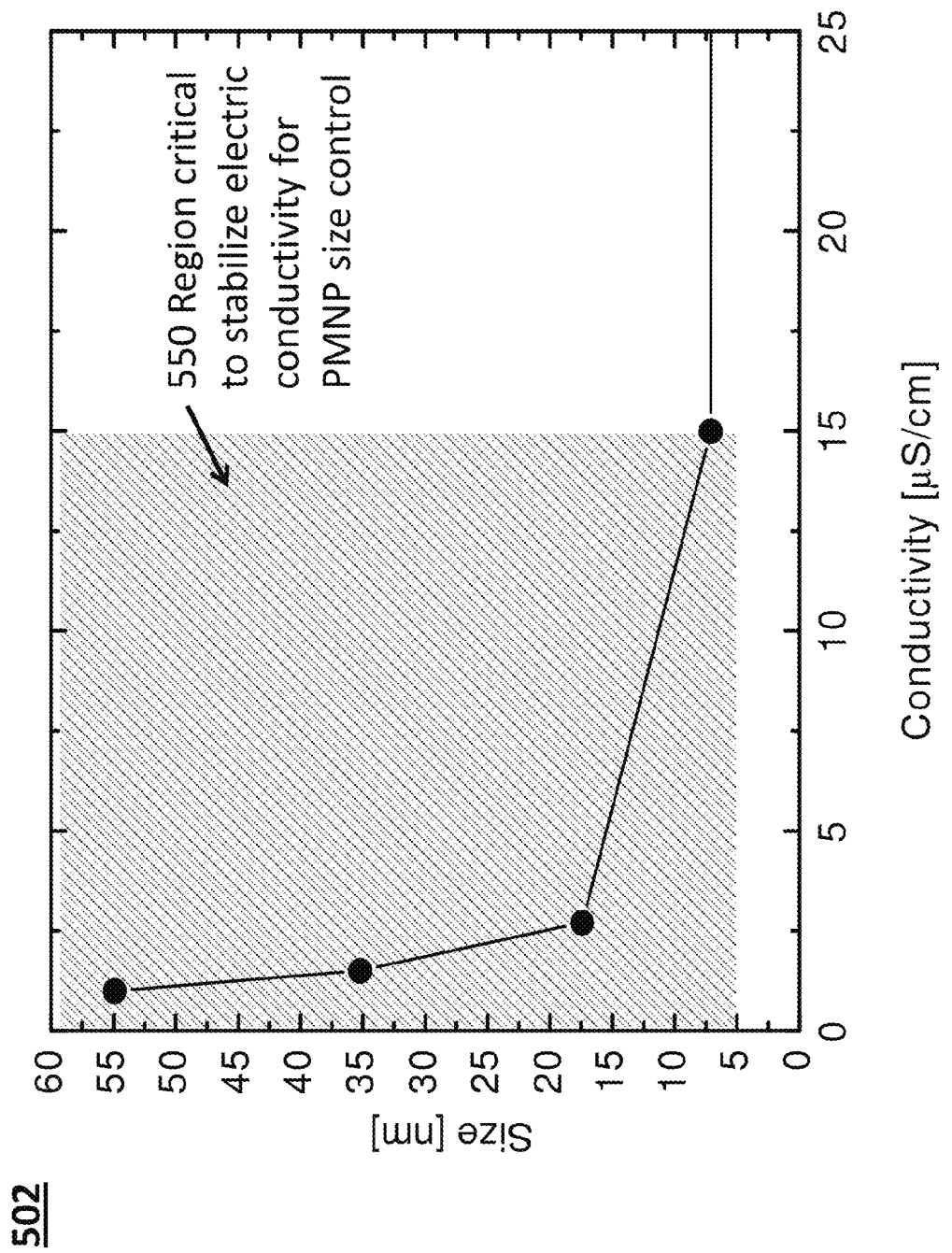

METHOD OF RELIABLE PARTICLE SIZE CONTROL FOR PREPARING AQUEOUS SUSPENSION OF PRECIOUS METAL NANOPARTICLES AND THE PRECIOUS METAL NANOPARTICLE SUSPENSION PREPARED BY THE METHOD THEREOF

RELATED APPLICATIONS

This application claims the benefit of U.S. Provisional Application No. 61/764,649 filed on Apr. 29, 2013; and claims the benefit as a continuation of International Application PCT/US14/16348, with an international filing date of Feb. 14, 2014. Both U.S. Provisional Application No. 61/764,649 filed on Apr. 29, 2013 and International Application PCT/US 14/16348, with an international filing date of Feb. 14, 2014 are hereby incorporated by reference.

BACKGROUND

Field of the Invention

The present invention relates to a method for producing an aqueous suspension of precious metal nanoparticles with reliable particle size control.

Description of the Related Art

Precious metal nanoparticles (PMNPs) and colloidal PMNPs, also called precious metal nanocolloids (PMNCs), are being widely investigated for their potential use in a wide variety of biological and medical applications. The precious metals (PM) of interest include gold, silver, copper, platinum, palladium, rhodium, ruthenium, iridium, osmium and any alloys including at least one of these metals. Applications of the PMNCs include using the PMNC as an imaging agent, a sensing agent, a gene-regulating agent, a targeted drug delivery carrier, or as a photoresponsive antibacterial therapeutic agent. Most of these applications require a surface modification on the PMNPs, which is also referred to as a surface functionalization.

Another important application of PMNPs is the field of spectroscopy by utilizing the unique optical properties originating from the localized surface plasmon resonance due to the collective motion of free electrons in the nanoparticles. Surface enhanced Raman scattering or surface enhanced Raman spectroscopy (SERS) is a very sensitive and valuable analytical method of spectroscopy that enhances Ramen scattering by molecules adsorbed onto or located on certain metal surfaces. The signal enhancement can be as high as $10^6$ or higher, thus the method can be used to detect single molecules or analytes of interest. The exact mechanism of the enhancement is not currently known, but typical surfaces for SERS comprise particles or roughened surfaces of precious metals such as silver, gold, copper, palladium, or platinum.

For these applications, PMNPs having an average diameter size of about 10 nm or larger are advantageous with respect to the following three features. First, PMNPs having a size of about 10 nm or larger give a larger signal enhancement when used for plasmonic spectroscopy such as SERS. For example, in the case of gold nanoparticles, 46-74 nm size in diameter is reported to be optimum for SERS according to "SERS enhancement by aggregated Au colloids: effect of particle size", *Phys. Chem. Chem. Phys.*, 11, 7455 (2009) by Steven E. J. Bel et al. In the case of silver nanoparticles the optimum size is about 50 to 60 nm in diameter according to "Optimal Size of Silver Nanoparticles for Surface-Enhanced Raman Spectroscopy", *J. Phys. Chem. C* 115, 1403 (2011) by K. G. Stamplecoskie et al.

Second, PMNPs having a size of about 10 nm or larger are sufficiently large enough that one can use centrifugal techniques to purify or isolate different sized populations of them during their use or during functionalization reactions with ligands. Generally, surface functionalization of these nanoparticles with ligand molecules is done by adding the ligand molecules to the colloidal solution in an excess amount, meaning more than the amount required for these molecules to occupy the entire available surface of the nanoparticles. Then centrifugal purification may be applied to remove the unattached molecules from the colloidal solution. However, the inventors found it difficult to induce centrifugal sedimentation of the PMNPs when the size of PMNPs becomes smaller than 10 nm, even in case of gold, which has one of the largest relative densities of the precious metals.

Third, a larger particle has a larger surface area, making it capable of having a variety of functional molecules loaded per particle. For example, the functional molecules may be different fluorescent molecules for different fluorescent wavelengths or they may be Raman active molecules having different vibration spectrum.

Currently, the majority of the PMNCs are being made by bottom-up fabrication methods like chemical synthesis methods such as those based on a reduction of the precious metal in an ionic state or those based on forming complex ions with ligand molecules. However, bottom-up fabrication methods have great difficulty in making larger particles in a controlled manner because of the difficulty of controlling the particle growth in these methods. Also, chemical synthesis inherently produces chemical by-products as a result of the counterpart reaction during the reduction of the precious metals resulting in residual ions in an electrolyte of the colloidal solution. Furthermore, currently commercially-available PMNCs made by chemical synthesis contain stabilizing agents that prevent the PMNPs from aggregating and precipitating out of the colloidal solution. The presence of the stabilizing agents or residual ions of the chemical by-products could result in undesirable noise signals which impair the sensitive spectroscopic measurements such as SERS.

Pulsed laser ablation in liquid (PLAL) is a method for synthesizing PMNPs directly from bulk materials, and can provide totally ligand-free PMNPs that are stable in a colloidal liquid that does not contain any stabilizers. Commonly owned U.S. Patent Application Pub. No. 2012/0225021, filed on Mar. 2, 2011 and assigned Ser. No. 13/038,788 discloses a method of producing stable bare colloidal gold nanoparticles in water by a top-down fabrication method using a PLAL method, with bulk gold as a target material.

Notwithstanding such recent advancements in PLAL methods, accurate and reliable size control of the PMNPs for PLAL is still a challenge.

For example, challenges associated with nanoparticle size control were recently demonstrated by C. Rehbock et al. (*Phys. Chem. Chem. Phys.*, "Size control of laser-fabricated surfactant-free gold nanoparticles with highly diluted electrolytes and their subsequent bio-conjugation", published on 3 Oct. 2012, DOI:10.1039/C2CP42641B. In this article a method was shown of generating gold nanoparticles (AuNPs) and subsequently bio-conjugated them by using a nanosecond PLAL approach and size control with a highly diluted electrolyte. More specifically, the AuNPs were generated and dispersed into a carrier steam of water containing a trace amount of salts. To control the size of the AuNPs by PLAL with the highly diluted electrolyte, C. Rehbock et al. demonstrated size control of the AuNPs by introducing a known amount of specific ions into the carrier stream of water. To produce the AuNPs' in a diameter of 10 nm or larger requires a precise control of ion concentration, as shown in C. Rehbock et al., because the produced size of AuNPs changes strongly depending on the ion concentration when the ion concentration is in a range below 30 micromole ($\mu$M). In this low concentration range the effect of a trace amount of externally introduced ions, such as a contamination, on nanoparticle size are no longer negligible. Such a trace amount of externally introduced ions can come not only from a contamination, but also from ions leaching from a water container into the water used for PLAL. Also, the uncertainty of the amount of externally introduced ions includes those coming from dissolved gases such as from the atmosphere the water has been exposed to before or during PLAL In principle, there are various ways to analyze individual ions in the electrolyte based on an element analysis such as inductively coupled plasma mass spectroscopy (ICP-MS), or based on molecular analyses such as high performance liquid chromatography (HPLC), liquid chromatography-mass spectrometry (LC-MS), Fourier transform infrared spectroscopy (FTIR) and Raman scattering (RS). However, all these measurements are too costly and time consuming to perform every time before a PLAL to quantify the net ion concentration, which actually determines the size of produced PMNPs in the PLAL process.

SUMMARY OF THE INVENTION

The summary of the invention is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment the present invention is a method of making a colloidal suspension of precious metal nanoparticles, the method comprising the steps of: a) providing a target material comprising a precious metal in contact with a liquid dispersion medium having an electrical conductivity within a predetermined conductivity range, said target material and said dispersion medium in contact with an ablation container; b) generating a plurality of precious metal nanoparticles by delivering laser pulses to said target material in said ablation container; c) prior to or while generating said plurality of precious metal nanoparticles monitoring and optionally adjusting said electric conductivity of said dispersion medium to maintain said electric conductivity of said dispersion medium in said predetermined conductivity range, wherein said predetermined conductivity range results in said precious metal nanoparticles having a predetermined size range; and d) forming a colloidal suspension of said precious metal nanoparticles.

In another embodiment the present invention is a colloidal suspension comprising a plurality of precious metal nanoparticles having a concentration of more than 0.01 nM in a liquid including electrolyte; and wherein the colloidal suspension exhibits an increase in the average size of the precious metal nanoparticles with a decrease in an electrical conductivity of the colloidal suspension below a threshold level.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

FIG. 5C is a plot of the size peak of AuNPs for different electrical conductivities in a linear scale with a shaded area which highlights a region to stabilize the electric conductivity in the dispersion media for PLAL;

Figure 7A:
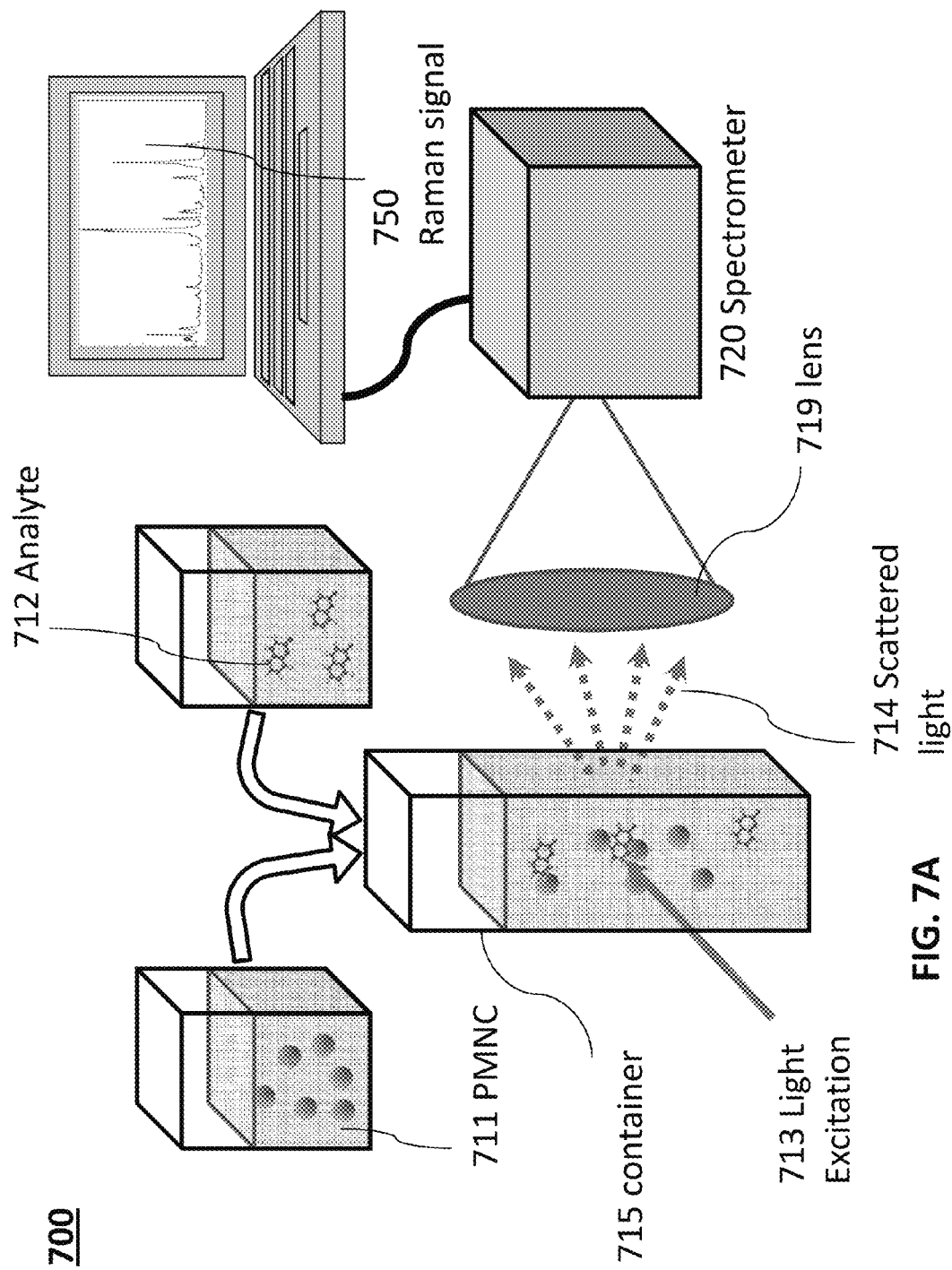
Figure 7B:
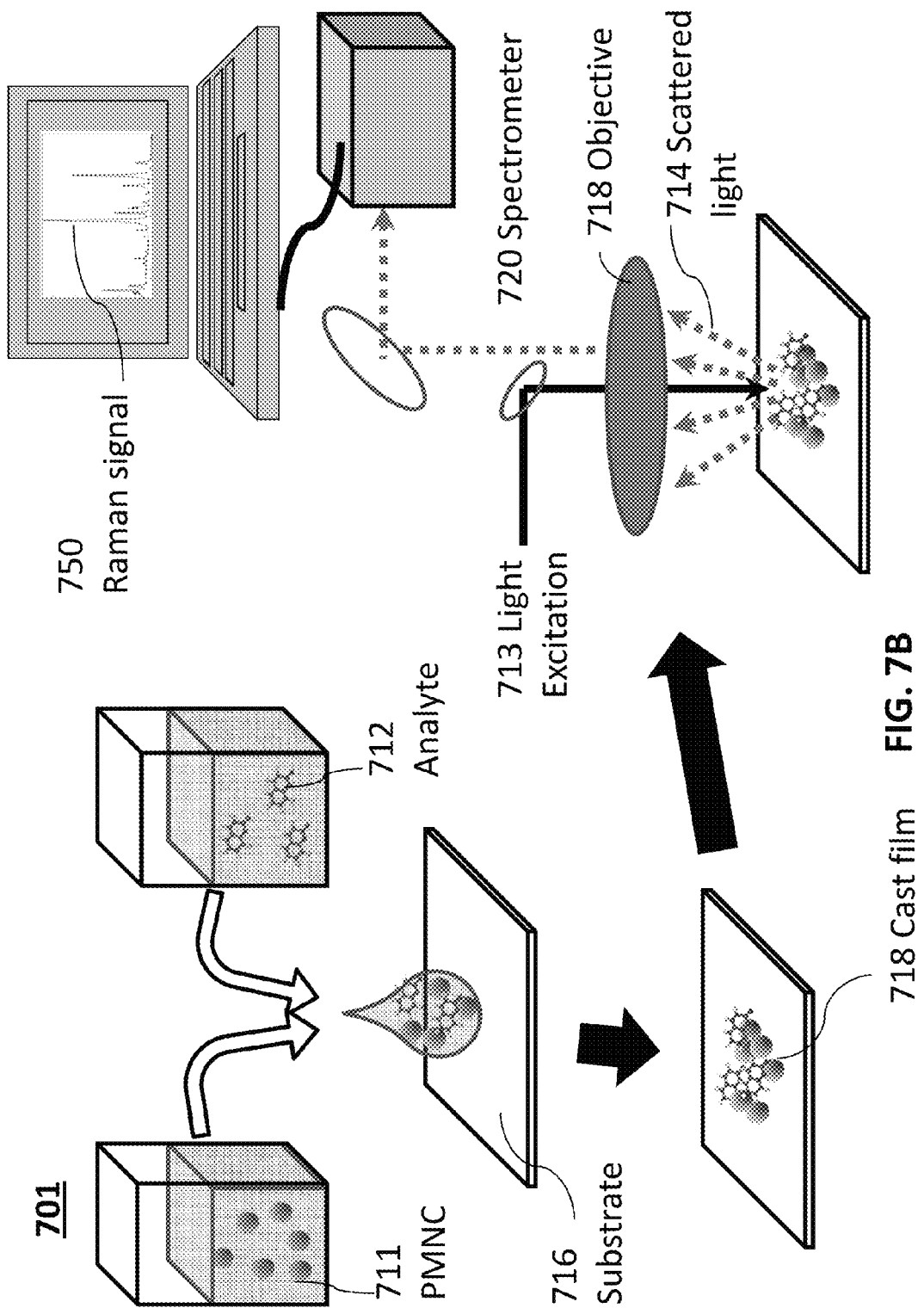
Figure 8:
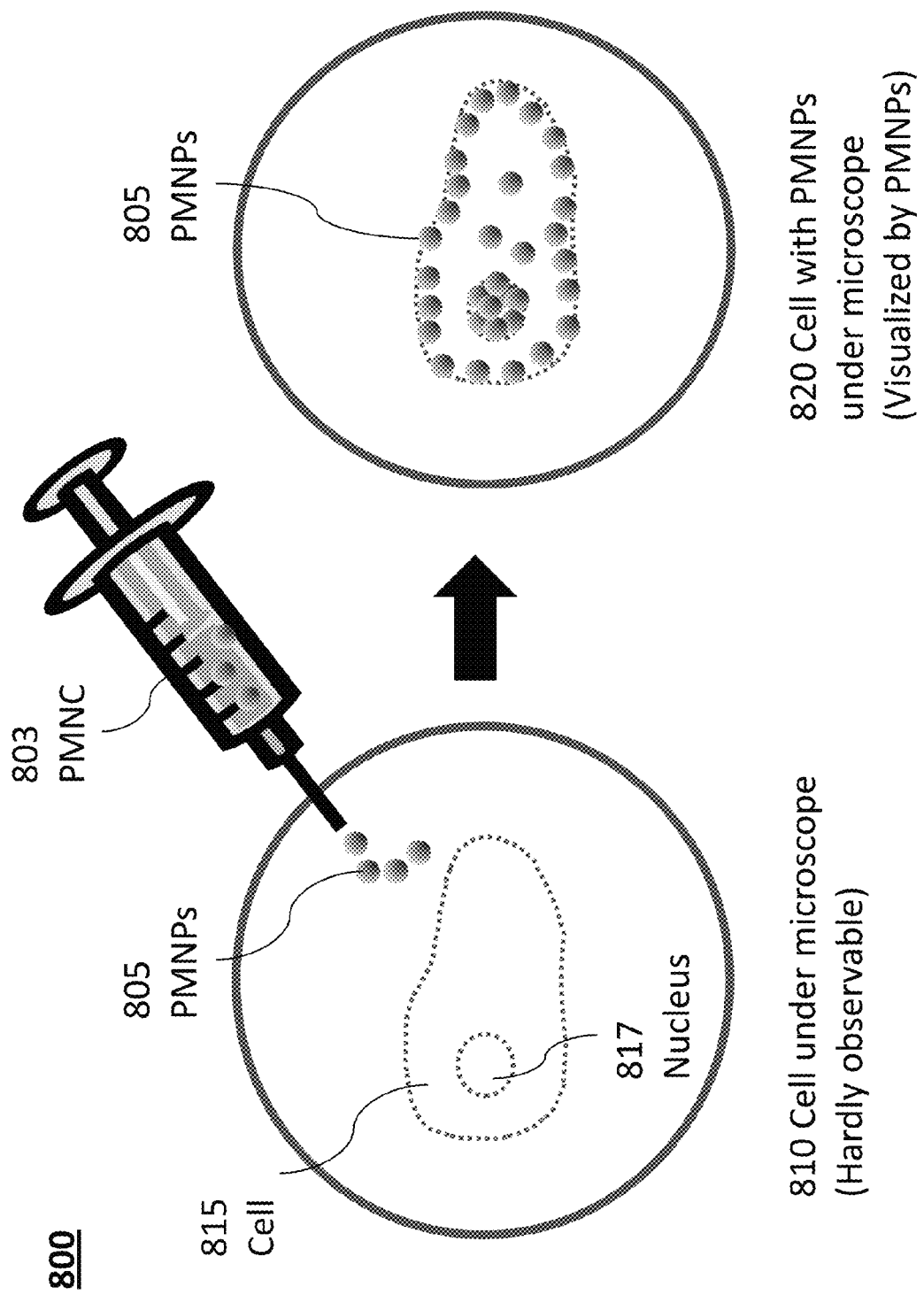
Figure 9:
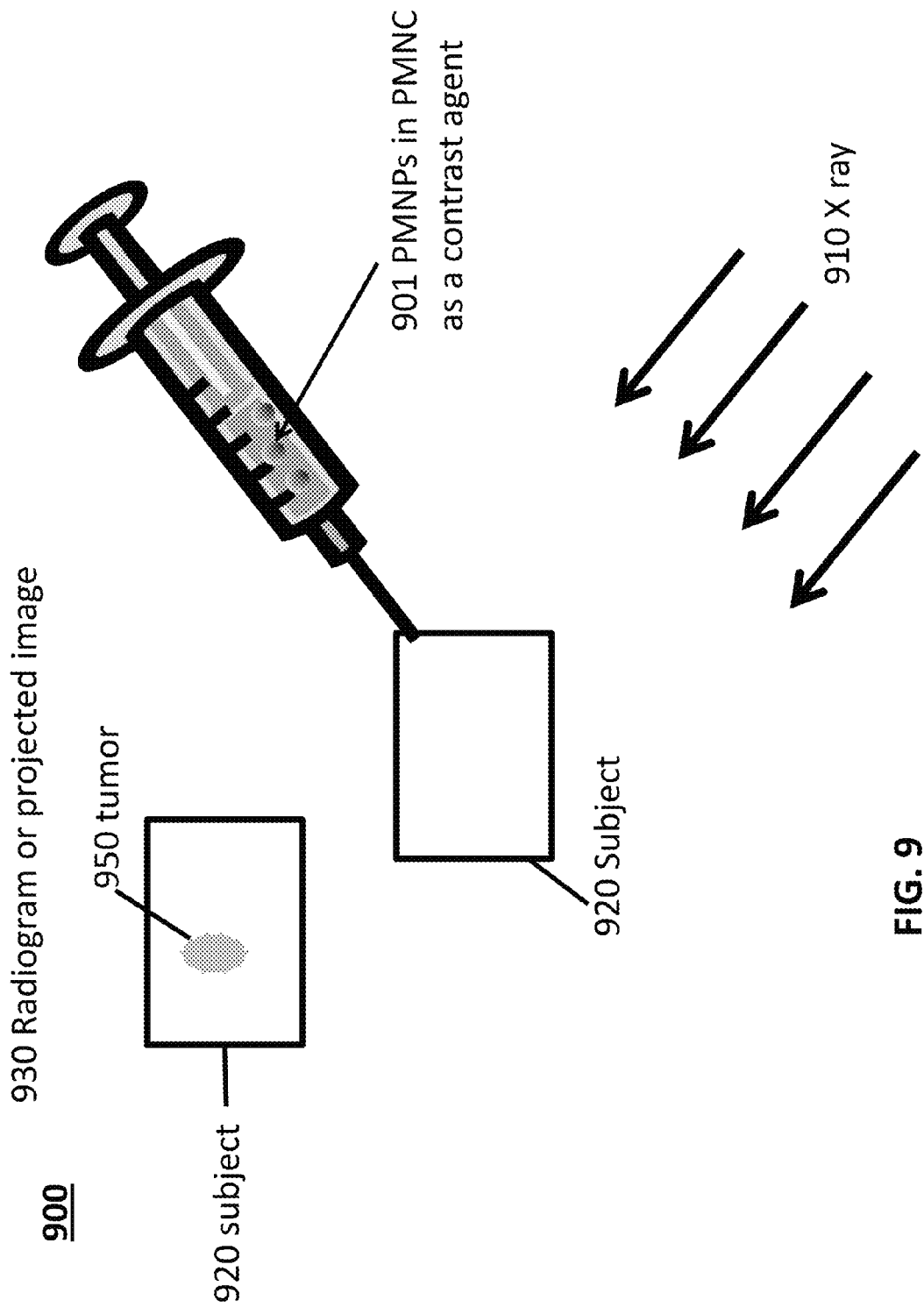

FIG. 7A schematically illustrates an arrangement for Raman spectroscopy where the PMNC is mixed with the solution containing an analyte;

FIG. 7B shows another arrangement for Raman spectroscopy where a cast film of the PMNC mixed with an analyte is used;

FIG. 8 illustrates an exemplary application of PMNPs as an imaging agent for a microscopic imaging method; and FIG. 9 illustrates an exemplary application of PMNPs as a contrast agent for a radiological imaging method.

DETAILED DESCRIPTION

Hereinafter, exemplary embodiments are described with reference to the drawing figures.

As used herein, a medium in which nanoparticles are to be spread out in, for example somewhat evenly throughout, is referred to as "dispersion medium" or simply "medium". For example, the medium may contain deionized water and electrolyte.

As used herein, the terms "colloidal suspension", "suspension", "colloidal solution" and "colloid" might be used interchangeably, referring to a colloidal system wherein nanoparticles are dispersed in a dispersion medium. For example, a suspension may contain metal nanoparticles, deionized water and electrolyte.

As used herein, "suspension liquid", "colloidal suspension liquid" and "liquid" might be used interchangeably to refer to the medium which may or may not contain the particles. The three terms are used interchangeably only if it is not necessary to specify whether or not the particles exist in the medium.

Precious metals (PMs) include gold, silver, copper, platinum, palladium, rhodium, ruthenium, iridium, osmium, and an alloy including at least one of the above listed metals. Precious metal nanoparticles (PMNPs) refer to precious metal fine particles or coalesced precious metal fine particles wherein the total size in at least one dimension, which includes the diameter for a spherical nanoparticle, is in the range from 1 nanometer to 1000 nanometers. Corresponding nanoparticles of the above listed precious metals, gold (Au), silver (Ag), copper (Cu), platinum (Pt), palladium (Pd), rhodium (Rh), ruthenium (Ru), iridium (Ir) and osmium (Os) are abbreviated, using the atomic symbols of these elements, to AuNP, AgNP, CuNP, PtNP, PdNP, RhNP, RuNP, IrNP and OsNP, respectively. Precious metal nanocolloids (PMNCs) refer to colloidal suspensions of the PMNPs. Correspondingly, nanocolloids of the above listed precious metals, gold (Au), silver (Ag), copper (Cu), platinum (Pt), palladium (Pd), rhodium (Rh), ruthenium (Ru), iridium (Ir) and osmium (Os) are abbreviated to AuNCs, AgNCs, CuNCs, PtNCs, PdNCs, RhNCs, RuNCs, IrNCs and OsNCs, respectively.

Herein the terms "laser beam", "pulsed laser beam" might be used interchangeably and may refer to an intermittent laser processing beam providing at least one pulse for irradiation of a target material, and may be further characterized by temporal parameters such as: (temporal) pulse width, pulse duration, pulse energy, peak power, or spatial parameters such as: beam size, beam profile, spot distribution, or spot size.

The following detailed description also utilizes a number of acronyms, which are generally well known in the art. While definitions are typically provided with the first instance of each acronym, for convenience, Table 1 provides a list of the acronyms and abbreviations used along with their respective definitions.

TABLE 1

| PLAL | Pulsed Laser Ablation in Liquid |
| PM | Precious Metal |
| PMNP | Precious Metal Nanoparticle |
| PMNC | Precious Metal Nanocolloid |
| PCSNC | Purification of Chemically Synthesized Nanocolloid |

For convenience, Table 2 provides a list of the abbreviations of the PMs, PMNPs and PMNCs included in the present invention.

TABLE 2

| Precious Metal (PM) | Precious Metal Nanoparticle (PMNP) | Precious metal nanocolloids (PMNCs) |
|---|---|---|
| gold (Au) | AuNP | AuNCs |
| silver (Ag) | AgNP | AgNCs |
| copper (Cu) | CuNP | CuNCs |
| platinum (Pt) | PtNP | PtNCs |
| palladium (Pd) | PdNP | PdNCs |
| rhodium (Rh) | RhNP | RhNCs |
| ruthenium (Ru) | RuNP | RuNCs |
| iridium (Ir) | IrNP | IrNCs |
| osmium (Os) | OsNP | OsNCs |

For convenience, Table 3 lists various units of length, concentration, time, or the like:

| Unit | Abbreviation | Parameter |
|---|---|---|
| Molar | M | Molar concentration |
| Micromolar | μM | Micro Molar concentration |
| Siemens | S | Electrical Conductance |
| Microsiemens per centimeter | μS/cm | Electrical Conductivity |
| Ohm | Ω | Electrical Resistance |
| MegaOhms centimeter | MΩ cm | Electrical Resistivity |

OVERVIEW

In one aspect the present invention relates to generation of a colloidal suspension containing PMNPs, and methods and systems for generating the same. In accordance with the present invention a colloidal suspension of PMNPs may be generated via pulsed laser ablation in liquid (PLAL).

In various embodiments in which PMNPs are generated by PLAL, a step of stabilizing or maintaining the electric conductivity at a specific value or with in a specific range in a water or an electrolyte where the generated PMNPs are to be dispersed into is included to accurately tune the average particle size of the generated PMNPs, particularly for nanoparticles in the size range of about 10 nm or larger, where accurate control of the total ion concentration is required. In another aspect, a step of size refinement is included to reduce the variance in the size of PMNPs. The combination of the two step results in a log normal-like statistical distribution of particle size having a well-controlled peak and a narrowed overall size distribution in which secondary peaks, shoulders, wings and other anomalies are largely eliminated.

Effects of externally introduced ions in water or electrolyte of the dispersed PMNPs were investigated. Ion concentration may be determined by measurement of electrical conductivity. The time evolution of electric conductivity in deionized water stored at room temperature in different commercially-available containers was measured and showed significant variation for stored PMNCs, particularly after lengthy storage periods of beyond one month.

In various preferred embodiments monitoring and control of electrical conductivity may be carried out at the time of PMNP generation. Such monitoring or control is advantageous with PLAL.

Monitoring and control of electrical conductivity stabilizes the quality of produced PMNPs by PLAL when carried out, in the media where PMNPs are to be dispersed, and prior to irradiation with the laser in PLAL arrangements.

In the following description examples of PLAL based methods and systems are disclosed as well as experimental results. As described herein, embodiments of the present invention relate to methods of producing colloidal suspensions of precious metal nanoparticles (PMNPs) and the PMNP suspension prepared by the methods thereof. The disclosed fabrication of the PMNCs by the PLAL method includes monitoring electrical conductivity of a dispersion medium before or during executing the PLAL for generating the PMNPs and also includes adjusting electrical conductivity of the dispersion medium if an adjustment of electrical conductivity is required for ensuring generation of the predetermined size of the PMNPs.

Figure 1:
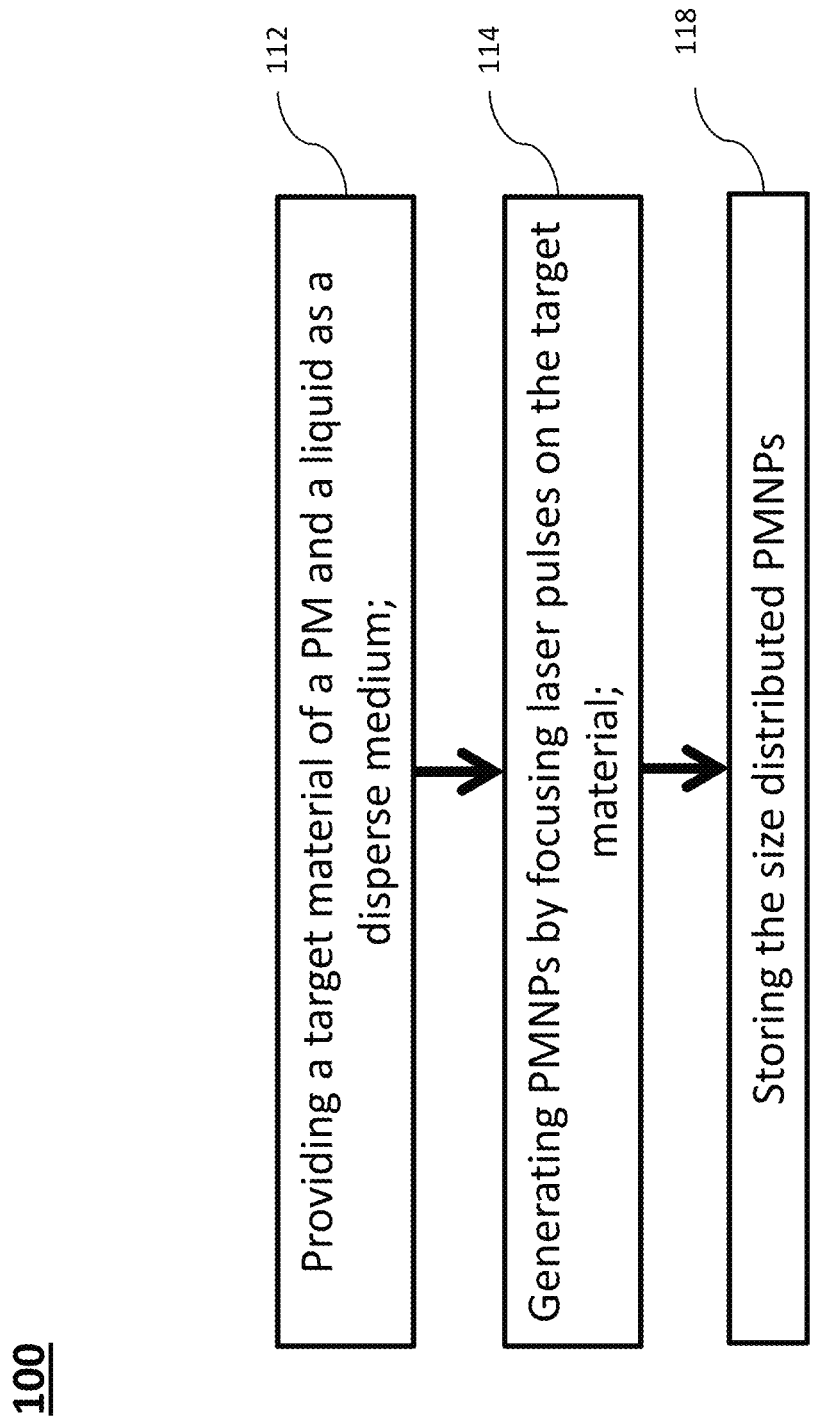
FIG. 1 is a flowchart illustrating a PRIOR ART process for generation of nanoparticles by a pulsed laser ablation in liquid (PLAL) method.

FIG. 1 is a flowchart illustrating a prior art method of generation of nanoparticles by a PLAL method. As shown, at step 112, a PM target material and a suspension liquid are provided. At step 114, PMNPs are generated by focusing laser pulses on the PM target material. At step 118, the size distributed PMNPs are stored in a container for a period of time.

Figure 2A:
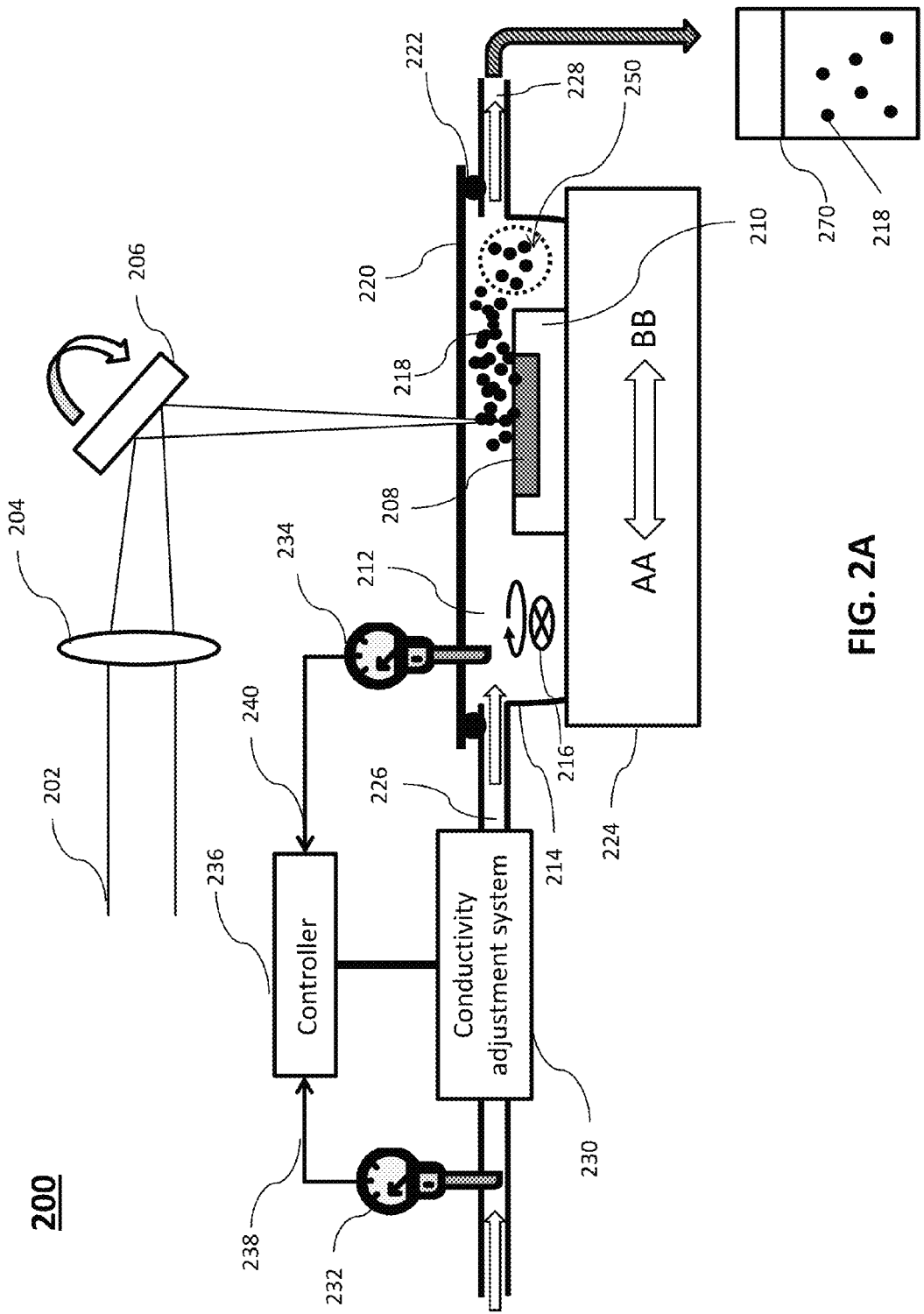
FIG. 2A is a schematic view of a laser based system for producing PMNCs from a bulk target of a precious metal using a PLAL method in accordance with exemplary embodiments of the present invention.

FIG. 2A is a schematic view of a laser based system for a PLAL method for producing PMNCs from a bulk target of a precious metal in accordance with exemplary embodiments of the present invention. As shown, PLAL system 200 includes laser beam 202, lens 204, guide mechanism 206, target 208, target holder 210, suspension liquid 212, container 214, stirring bar 216, generated PMNPs 218, optical window 220, O-ring seal 222, motion stage 224, inlet 226, outlet 228, conductivity adjustment system 230, conductivity monitoring device 232, conductivity monitoring device 234, controller 236, and colloidal suspension 250 as a region of the liquid prior to collection and storage in container 270.

Laser beam 202 may be delivered by a pulsed laser source (not shown) and focused by lens 204 and guided by guide mechanism 206 to irradiate target 208. In an alternative exemplary embodiment, lens 204 may be placed after guide mechanism 206. The pulsed laser source for generating laser beam 202 may be a commercially available ultrafast fiber laser operating at 1045 nanometers (nm) with an adjustable pulse repetition rate of 100 kHz-51 MHz. For example, a D-1000 ultrafast fiber laser available from IMRA America Inc. may be utilized in system 200 as a laser pulse source. The D-1000 IMRA ultrafast fiber laser may produce laser pulses with pulse energy up to 10 microJoules (µJ) per pulse and pulse width shorter than 700 femtoseconds (fs) at a repetition rate of 100 kHz. By way of example, laser beam 202 may be guided to the target with a two dimensional laser scanning system, for example an X-Y galvanometer scanner 206 equipped with a focusing lens 204, which may be an f-theta lens. In this example the laser scanning arrangement is configured as a post-objective scanning system. Other suitable scanning arrangements and beam/target positioning mechanisms may be utilized with design choices based on scan speed, positioning accuracy, and other variables.

Target 208, which may be received as a commercially available precious metal bulk target, may be mounted in target holder 210. Target 208 may be a bulk precious metal of interest having a flat surface. Target 208 and target holder 210 are submerged by several millimeters, and preferably less than 2 cm, below the surface of suspension liquid 212 in container 214. Stirring bar 216 may generate a flow of suspension liquid 212, which may help prevent generated PMNPs 218 from remaining in a laser irradiating area. The flow of suspension liquid 212 also cools a laser focal volume.

In the example of FIG. 2A, container 214 is covered by optical window 220. O-ring seal 222 is placed between optical window 220 and container 214 to prevent suspension liquid 212 from leaking out. Container 214 is fixed on a motion stage 224 that produces translational motion as indicated of the container 214 and suspension liquid 212. Container 214 has inlet 226 and outlet 228 and suspension liquid 212 flows through container 214 from inlet 226 to outlet 228, so that generated PMNPs 218 are carried away and collected out of container 214 in a container 270. In various implementations the flow of suspension liquid 212 should be fast enough to fill the gap between ablated material of target 208 and optical window 220 to thereby avoid having any gas bubbles generated during laser ablation from staying on optical window 220. The optical window 220 is typically a glass window.

Suspension liquid 212 may include water, methanol, ethanol, acetone, or another organic liquid containing electrolyte and acts as a dispersion medium for generating the PMNCs.

Conductivity adjustment system 230 is placed in an upstream location of container 214 near inlet 226 and controlled by controller 236. Conductivity monitoring device 232 is used to monitor an upstream conductivity of suspension liquid 212 before conductivity adjustment system 230. Conductivity monitoring device 234 is used to monitor a conductivity of suspension liquid 212 in container 214 before generating PMNPs 218. Controller 236 receives feedback data 238 and 240 from conductivity monitoring devices 232 and 234, respectively, and controls conductivity adjustment system 230, so that a required conductivity may be stabilized in suspension liquid 212 just before generating PMNPs 218 by the PLAL. The feedback data 238 and 240 can be used in conjunction with the controller 236 and conductivity adjustment system 230 to both monitor and adjust the electrical conductivity to maintain it within a desired range that depends on the desires size of the PMNPs.

Figure 3:
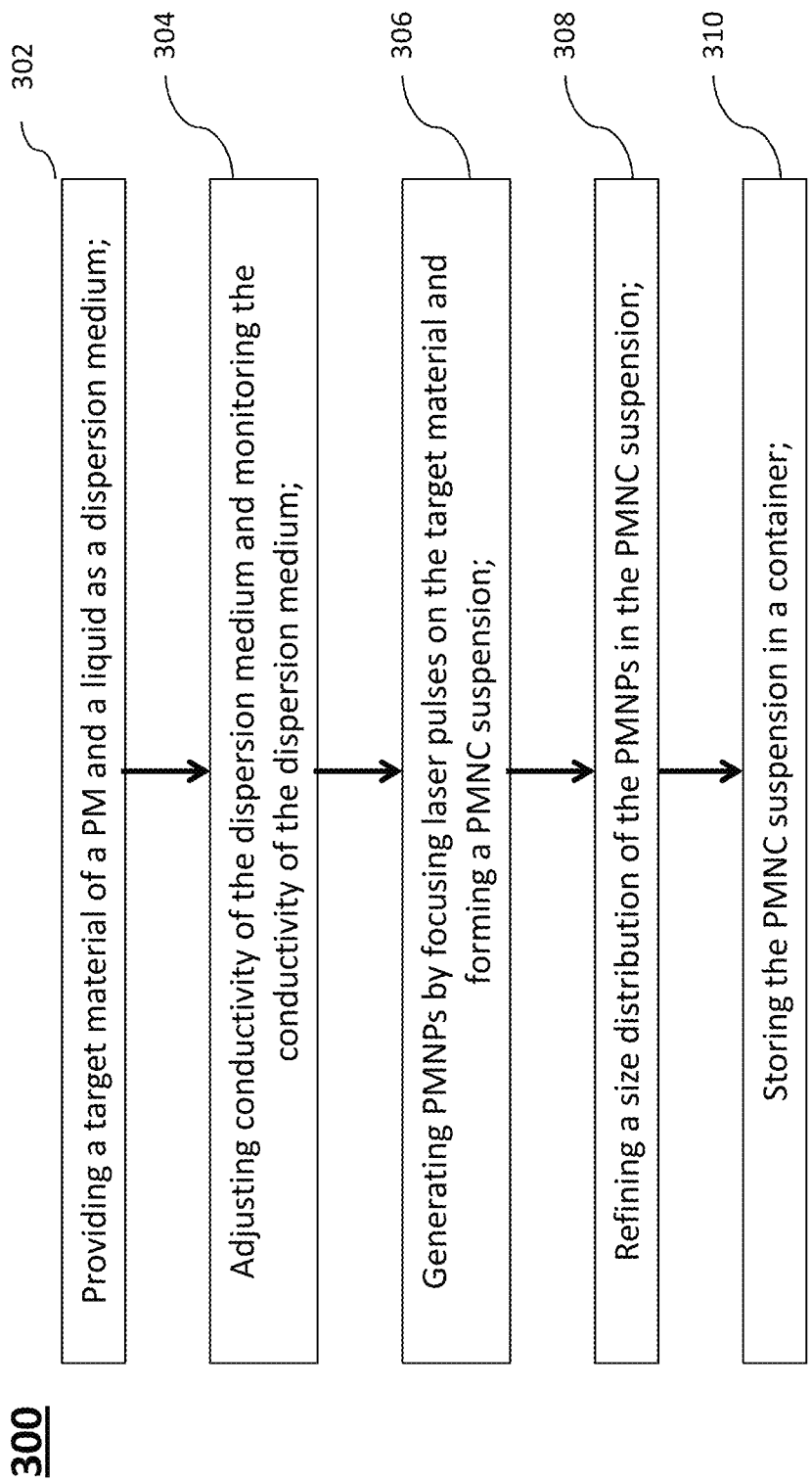
FIG. 3 is a flowchart showing a process of generation of nanoparticles by the PLAL method shown in FIG. 2A in accordance with exemplary embodiments of the present invention.

FIG. 3 is a flowchart showing a process from generation of nanoparticles by the PLAL method shown in FIG. 2A to storage of the prepared PMNCs in accordance with exemplary embodiments of the present invention. As shown, process 300 includes the PLAL for generating the PMNCs, which uses electric conductivity of the electrolyte in the liquid as an observable physical parameter to accurately control the size of the generated PMNPs. The PMNCs generated by the PLAL includes a process of monitoring and adjusting the electric conductivity of the electrolyte before or during generating the PMNPs. The PLAL may provide a method that accurately controls the size of the PMNPs based in part on the electrical conductance of the dispersion medium. As will be understood by one of ordinary skill in the art, the electrical resistivity of a solution is the reciprocal of the electrical conductivity and thus in an alternative embodiment the electrical resistivity of the electrolyte or dispersion medium could be monitored using a resistance meter in place of the devices 223 and 224 and kept within the desired parameters to control generated particle size by PLAL. In the present specification and claims the electrical conductivity will be the monitored and adjusted parameter; however it will be understood that electrical resistivity could be substituted for conductivity after conversion to the reciprocal of the desired electrical conductivity value.

As shown, at step 302, target 208 of a precious metal is received, or otherwise provided, for an ablation target. In one exemplary embodiment, target 208 includes a bulk gold target positioned in container 214 having removable optical window 220 on the top of container 214. Target 208 is submerged a distance, from several millimeters to preferably less than 1 centimeter, below the surface of suspension liquid 212. At step 302, liquid 212, as a medium in which PMNPs are to be dispersed, is also provided. Suspension liquid 212 may be any liquid that is transparent to the wavelength of laser beam 202, and serves as a dispersion medium for nanoparticles to be distributed, and the nanoparticles may be distributed more or less evenly throughout the dispersion medium. Suspension liquid 212 may include water, methanol, ethanol, acetone, or another organic liquid that contains electrolyte. In one embodiment, suspension liquid 212 may be de-ionized or distilled water having electrolyte dissolved therein where the electrical conductivity of the suspension liquid 212 is adjusted to a value of 20 µS/cm or smaller, from 1 µS/cm to 10 µS/cm, or from 1.5 µS/cm to 8 µS/cm, according to a required size for the generated PMNPs 218. PLAL system 200 thus allows for generating colloidal gold nanoparticles (AuNCs) in situ in suspension liquid 212 so that a colloidal gold suspension is formed. The formed gold nanoparticles (AuNPs) are then stably suspended in suspension liquid 212 and thus no dispersants, stabilizer agents, surfactants or other materials are required to maintain the colloidal gold suspension in a stable state. Thus, a unique colloidal gold suspension that contains bare gold nanoparticles is generated. Here, an ion concentration in suspension liquid 212 may be preliminarily estimated according to the amount of the electrolyte in suspension liquid 212 and a factor of dilution or condensation of the electrolyte.

At step 304, conductivity of suspension liquid 212 before or during generating PMNPs 218 is monitored by conductivity monitoring devices 232, 234. The conductivity of suspension liquid 212 is also adjusted by conductivity adjustment system 230 if an adjustment of the conductivity is required for a predetermined size of PMNPs 218.

As described above, the total ion concentration in water easily changes by external factors such as an exposure to the surface of a container material for production environment or storage and exposure to the atmosphere. Subsequent to contact with the container the water may contain additional ions to the preliminary estimated ion amount, which can have a great impact on the size of generated PMNPs 218 in a highly-diluted electrolyte using the PLAL. In practice, it is difficult for the water or electrolyte to avoid any external contact. However, the problem of uncertainty of the total ion concentration in the highly-diluted electrolyte is solved with at least one embodiment of the present invention by measuring electric conductivity of the highly-diluted electrolyte, by preferably measuring the electric conductivity of the highly-diluted electrolyte before irradiating laser beam 202 on target 208. Conductivity monitoring devices 232, 234 are employed in various embodiments to measure the electric conductivity of the highly-diluted electrolyte. For example, conductivity monitoring device 232 is placed at inlet 226 to measure the electric conductivity of the highly-diluted electrolyte before the highly-diluted electrolyte enters container 214. Conductivity monitoring device 234 is placed in container 214 close to inlet 226, where no PMNPs are generated, to measure the electric conductivity of the highly-diluted electrolyte. Conductivity monitoring devices 232, 234 may be a commercially-available electrical conductivity meter, for example, a commercially-available water conductivity meter. In some embodiments a minimum detectable change in conductivity between about 1 µS/cm and 5 µS/cm, or better, is required for the commercially-available electrical conductivity meters to be used for conductivity monitoring devices 232, 234. As discussed above, resistivity is the reciprocal of the conductivity, the range from 1 µS/cm to 5 µS/cm in conductivity is converted to the range from 1 MΩcm to 0.2 MΩcm in resistivity for conductivity monitoring devices 232, 234. The conversion relation between resistivity and conductivity is Resistivity in MΩcm=1/(Conductivity in µS/cm). Hereinafter these equivalent parameters are unified into conductivity (µS/cm). In some embodiments the resolution for the conductivity measurement is about 1 µS/cm or better.

Experiments showed the effect of externally introduced ions in water or electrolyte is no longer negligible when the ion concentration is in the range below 30 µM. Thus, particle diameters of the generated AuNPs change when the ion concentration is in the range below 30 µM.

In general, the conductivity of the electrolyte is converted to the total dissolved solid (TDS) in water assuming that the solid is sodium chloride (NaCl). Through this conversion, the conductivity of 1 µS/cm corresponds to about 0.6 mg of NaCl/kg of water, which is about 10 µM in molar concentration. Taking that conversion into account, the ion concentration of 30 µM, below which sizes of the generated AuNPs strongly depend on the ion concentration, corresponds to a conductivity of about 3 µS/cm. Particularly, the ion concentration of 10 µM or smaller is required to produce the AuNPs larger than about 15 nm according to C. Rehbock et al.

Figure 4:
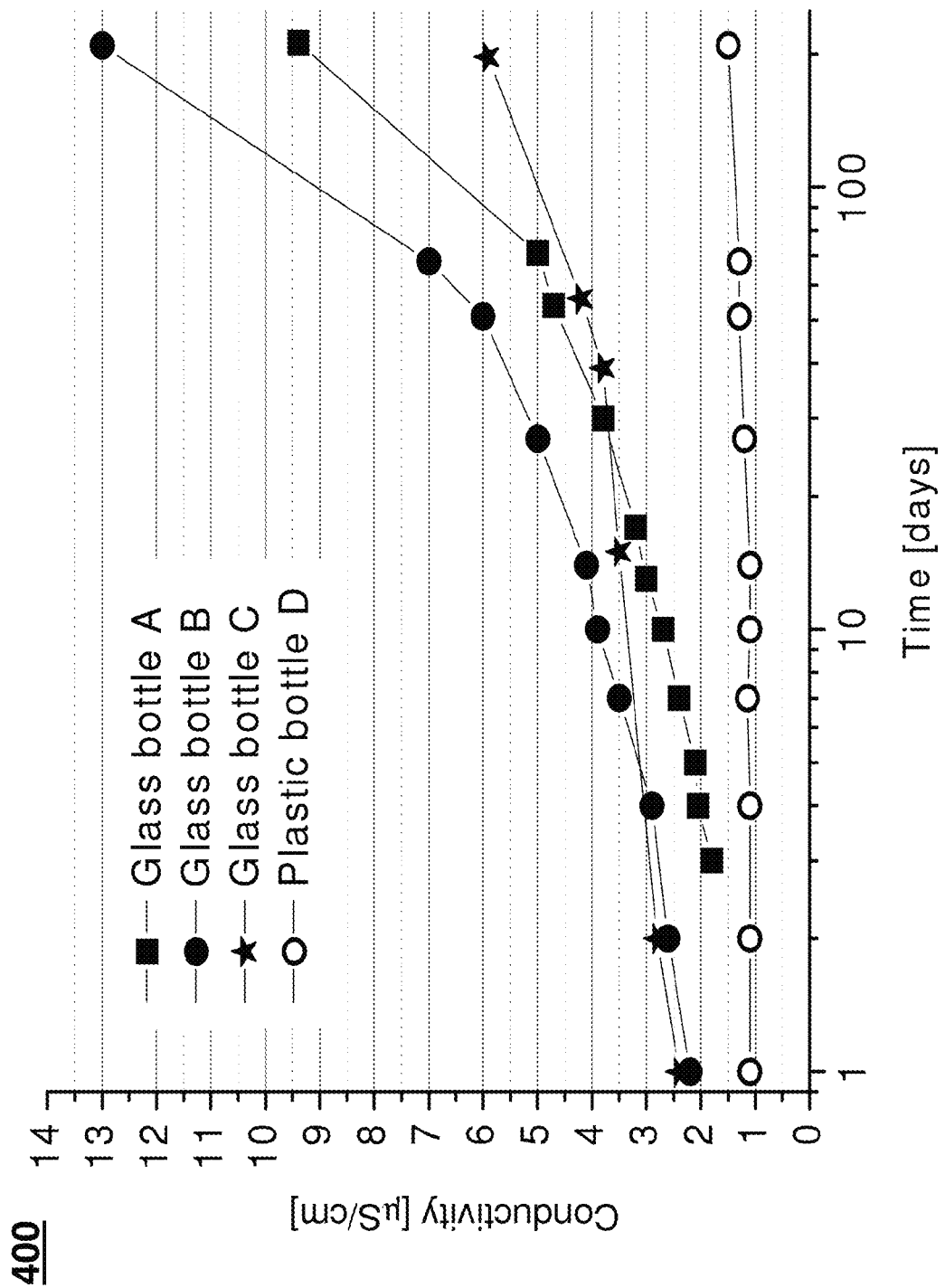
FIG. 4 illustrates an example of the time evolution of electrical conductivity in deionized water containing electrolyte stored at room temperature in four different commercially-available containers in accordance with exemplary embodiments of the present invention.

As calculated above, the introduction of 10 µM of NaCl causes an increase in the electrical conductivity of about 1 µS/cm. In proportion, introduction of 1 µM of NaCl gives only 0.1 µS/cm increase of conductivity. It has been predicted, theoretically, that the electrical conductivity of extremely purified water at 25° C. can be as low as 0.055 µS/cm. However, in practice, it has been recognized that a typical electrical conductivity of deionized water stored and equilibrated in atmosphere at room temperature is in the range between 0.5 µS/cm and 1.5 µS/cm. As a result, for example, simply transferring the highly-diluted electrolyte from a storage container to the ablation container 214 and subsequent storage of the colloidal suspension can alter the initial ion amount in a dispersion medium. FIG. 4 is an example of the time evolution of electrical conductivity in deionized water containing electrolyte stored at room temperature in four different commercially-available containers in accordance with exemplary embodiments of the present invention. The containers are three different transparent borosilicate glass bottles A, B, and C, and a transparent polycarbonate bottle D. The initial electrical conductivity of the deionized water is about 1 µS/cm when tapped initially. As shown in FIG. 4, the electrical conductivity of the deionized water increases with time when stored. Especially in the glass bottles, the increase of the electrical conductivity in the first week is 1.3 µS/cm or higher. Although the rate of the increase becomes reduced after the first week, the electrical conductivity still continues to increase up to 13 µS/cm after 200 days. The data shows that storage in plastic bottles leads to the slowest and smallest increase in conductivity over time. Thus, preferably the material of the container 244 shown in FIG. 2A in contact with the generated PMNCs will be a polymer or a plastic such as polycarbonate, polyethylene, polyethylene terephthalate, polyethylene terephthalate glycol-modified, or polystyrene. Use of such container material should further stabilize the electrical conductivity of the dispersion medium and PMNCs.

Conductivity adjustment step 304 may be performed by an in situ or ex situ way. Regarding controlling the electrical conductivity, for the ex situ case, it may be desirable to execute it immediately prior to the step of generating the nanoparticles when further exposure of the suspension liquid 212 to an external ion source is minimized For the in situ case, in one exemplary embodiment, the PLAL system 200 shown in FIG. 2A may be equipped with the conductivity monitoring device 234.

Regarding conductivity adjustment, for the ex-situ case, conductivity adjustment step 304 is also preferred to be executed immediately prior to the next step of generating nanoparticles when further exposure of suspension liquid 212 to an external ion source is minimized To increase the conductivity in suspension liquid 212, a solution of the above listed electrolyte such as KCl and NaOH may be added to suspension liquid 212. To decrease the conductivity in suspension liquid 212, de-ionized or distilled water, probably containing a trace amount of electrolyte, of which the conductivity is a few µS/cm or lower may be added to suspension liquid 212. For the in-situ case, in an exemplary embodiment, laser based system 200 shown in FIG. 2A may have conductivity adjustment system 230, in an upstream location, controlled by controller 236. Another conductivity monitoring device 232 may be used to monitor an upstream conductivity of suspension liquid 212 before conductivity adjustment system 230. Receiving feedback data 238 and 240 from conductivity monitoring devices 232 and 234, controller 236 controls conductivity adjustment system 230 so that a required conductivity is stabilized in suspension liquid 212 before PMNP generation by the PLAL takes place.

In at least one implementation a system may be configured for automatic control of conductivity adjustment. Flow control from a first liquid may be controlled to increase conductivity, and from a second liquid to decreases conductivity. Controller 236 may be operatively connected to a computer (not shown) which includes a program to monitor conductivity and, based upon calibration information, adjust conductivity. In some implementations semi-automatic or computer assisted control may be implemented.

At step 306, gold nanoparticles (AuNPs) are generated by irradiating laser beam 202 on target 208. As shown in FIG. 2A, and as discussed above, laser beam 202 is delivered by a pulsed laser source (not shown), focused by lens 204, and guided by guide mechanism 206 onto target 208. Target 208 mounted in target holder 210 is a bulk material of precious metal, such as, gold having a flat surface. Target 208 and target holder 210 are submerged by several millimeters and preferably less than 2 cm, below the surface of suspension liquid 212 in container 214. The flow of suspension liquid 212 generated by the movement of stirring bar 216 helps prevent generated PMNPs 218 from remaining in a laser irradiating area. The flow of suspension liquid 212 also cools a laser focal volume. A liquid layer thickness is determined by negligible linear as well as nonlinear absorption of laser beam 202. Thus, the wavelength of the pulsed laser source may be from the mid-infrared to near-infrared range (e.g., about 2000 nm to 780 nm), to the visible range (e.g., 700 nm to 400 nm) or to the ultraviolet range (e.g., 395 nm to 266 nm). Laser beam 202 may provide a pulse energy of from 10 nanoJoule (nJ) to 2 milliJoule (mJ), from 50 nJ to 300 microJoules ($\mu J$), or from 0.1 to 100 $\mu J$. Laser beam 202 may provide a pulse having a duration of from 10 femtoseconds (fs) to 100 nanoseconds (ns), from 100 fs to 10 ns, or from 100 fs to 10 picoseconds (ps).

Extremely short pulse durations, for example shorter than 100 fs, reduce unwanted thermal effects, but when the pulse duration approaches several tens of fs, or when the liquid layer has a non-negligible thickness, a temporal broadening of the pulse due to the wavelength dispersion of the refractive index in the liquid (e.g., suspension liquid 212) becomes significant. Such dispersion may be compensated for using one or a combination of techniques. An additional optical component for dispersion compensation may be inserted in an optical path to compensate for the dispersion of the pulse. The optical components for the dispersion compensation include, but are not limited to, a pair of optical diffractive gratings and a pair of volume Bragg gratings. Insertion of a material having a dispersion of the opposite sign can compensate for dispersion of the pulse. An optical waveguide including, but not limited to, an optical fiber, a photonic crystal fiber, a photonic band gap fiber, a non-linear optical fiber, and a fiber Bragg grating can compensate for the effect of pulse duration broadening.

In various exemplary embodiments laser beam 202 may provide a pulse repetition rate from 1 kHz to 100 MHz, from 10 kHz to 1 MHz, from 100 kHz to 1 MHz, or from 100 kHz to 10 MHz. Guide mechanism 206 may be a vibration mirror configured for fast scanning or other movement of laser beam 202 on the surface of target 208. The vibration frequency of the vibration mirror is preferably 10 Hz or greater with angular amplitude of 1 mrad or greater, such that a scanning speed on the surface is 0.01 m/s or greater. The vibration mirror may be a piezo-driven mirror, a galvanometer minor, or other suitable apparatus for beam movement. Two or more mirrors may be used to achieve a two-dimensional movement in an image plane of an objective lens as discussed above. Preferably, an image plane and the target surface of target 208 are entirely in parallel, and more preferably the incident angle of laser beam 202 on target 208 is a constant angle independent of the position of a spot in the image plane. Another lens or lens system may be also implemented to adjust the position of a focusing point of laser beam 202 along the optical path.

In some implementations a molding step or a shaping step such as a cutting, pressing, machining and post-forming process may be applied to the bulk precious metal of target 208 to make the surface of target 208 flat. The flat surface may be polished.

Target holder 210 may be made of an optically durable and chemically inert material such as glass, but it is not necessary as long as target 208 is held steady in position.

Suspension liquid 212 may be de-ionized or distilled water having electrolyte dissolved therein where the conductivity of suspension liquid 212 is adjusted to a certain value, for example, 25 $\mu S/cm$ or smaller, preferably from 1 $\mu S/cm$ to 10 $\mu S/cm$, and more preferably from 1.5 $\mu S/cm$ to 8 $\mu S/cm$, according to the required size for generated PMNPs 218.

The dissolved electrolyte may be an inorganic or organic salt including anions and cations formed with at least one element from the following groups.

alkali metals (i.e., Group 1 elements in the periodic table) such as Na and K;

alkaline-earth metal (i.e., Group 2 elements in the periodic table) such as Mg and Ca;

pnictogen (i.e., Group 15 elements in the periodic table) such as N and P;

chalcogen (i.e., Group 16 elements in the periodic table) such as O and S;

halogen (i.e., Group 17 elements in the periodic table) such as Cl, Br and I;

and an organic acid function such as a carboxyl acid (COO—).

Laser ablation system 200 includes a liquid circulation system (not shown). The flow of suspension liquid 212 is introduced into container 214 by the liquid circulation system through inlet 226 and outlet 228. Preferably, suspension liquid 212 flows at a rate of 1 ml/s or greater, and more preferably at a rate of 10 ml/s or greater. Here, the flow of suspension liquid 212, the movement of laser beam 202 on target 208, or both may be used to control heat accumulation in the area of laser irradiation.

Optical window 220 is placed on the top of container 214 for small particle generation, as such, the gap between target 208 and glass window 220 is filled with flowing suspension liquid 212. Liquid flow may uniformly distribute generated PMNPs 218 in suspension liquid 212. If there is no optical window 220 on top of container 214, the upper surface of the flowing suspension liquid 212 may fluctuate during flowing and may cause a fluctuation in the thickness of suspension liquid 212 above ablation target 208. This may change the optical path of laser beam 202 and cause a broader size distribution of generated PMNPs 218. Therefore, in the described embodiments of the present invention, optical window 220 above the flowing suspension liquid 212 is introduced to keep a constant depth of suspension liquid 212 above ablation target 208. Furthermore, without the circulation system, a lateral vibration movement AA-BB, for example perpendicular to laser beam 202 as indicated in FIG. 2A, to motion stage 224 that may also cause suspension liquid 212 to flow locally across an ablation spot on target 208.

Motion stage 224 preferably has a vibration frequency of several Hz, for example, a vibration frequency in the range from about 0.001 to 100 Hz, and an amplitude of several millimeters. A shaker (not shown) may also be used to generate liquid circulation, where a circular movement of the shaker causes a circular movement of suspension liquid 212 too. Optical window 220 might not be necessary for using motion stage 224 or the shaker. However, the use of motion stage 224 or the shaker may introduce non-uniformity in the thickness of the liquid layer above target 208 and cause a broader size distribution of generated PMNPs 218.

In an alternative embodiment, target 208 may not be completely submerged in suspension liquid 212. As long as a portion of target 208 is in contact with suspension liquid 212, the laser ablation by the PLAL may take place at an interface of target 208 and suspension liquid 212.

A portion of the suspension liquid 212 in which the generated PMNPs 218 exist is collected in a form of a colloidal suspension, illustrated as region 250 of liquid 212, and is collected and stored in a container 270 as an outcome of step 306. A collection of the colloidal suspension 250 may be done after or during step 306. For a circulation system, the colloidal suspension 250 may be taken at any suitable location through which the suspension liquid 212 moves from outlet 228 to inlet 226.

Figure 2B:
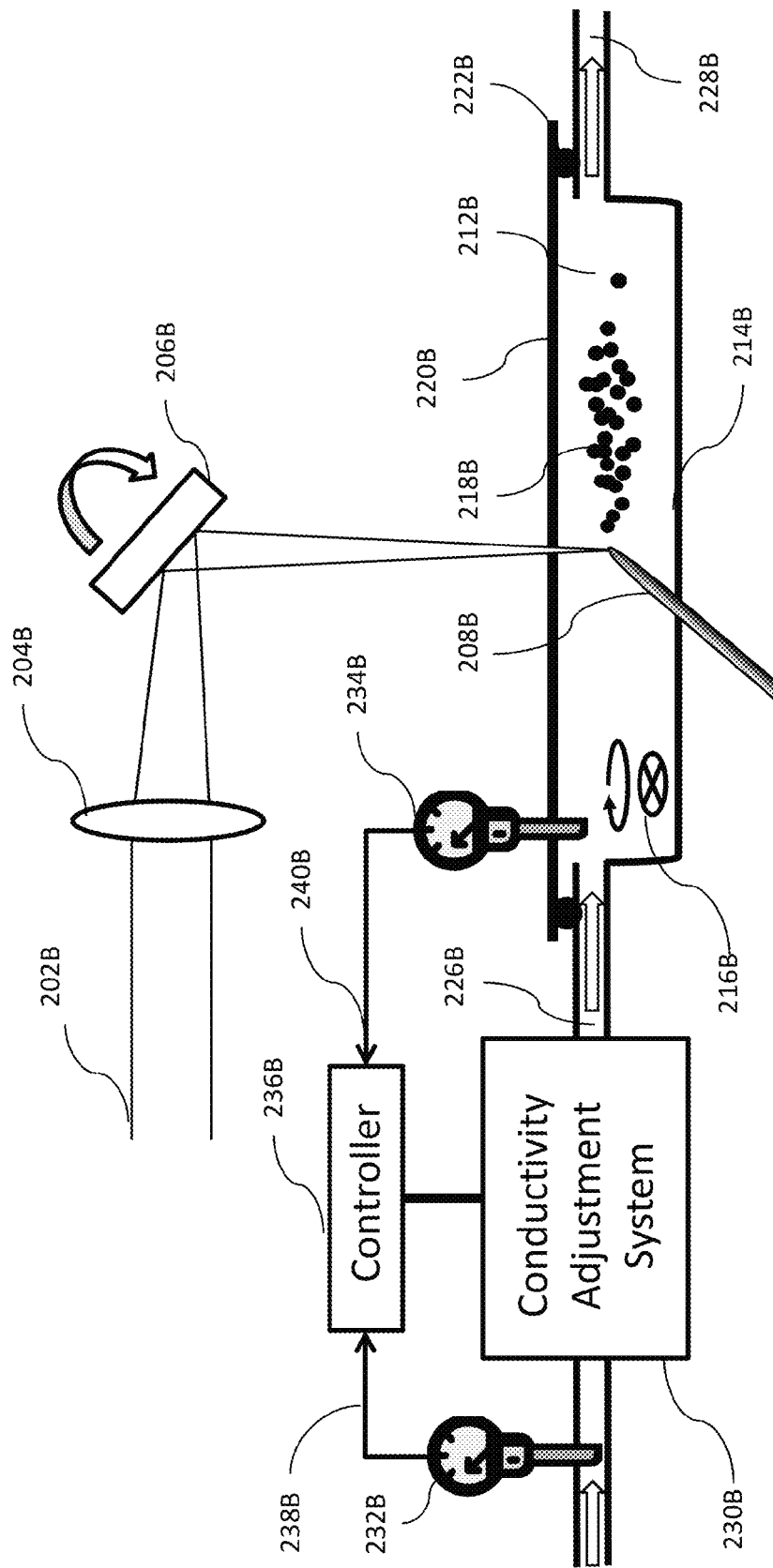
FIG. 2B is a schematic view of a laser based system for producing PMNCs from a wire-shaped precious metal bulk target using a PLAL method in accordance with exemplary embodiments of the present invention.

In an alternative embodiment of PLAL, a target material may be a wire-shaped precious metal being fed into a liquid from outside as schematically shown in FIG. 2B. Laser based system 201 includes laser beam 202B, lens 204B, guide mechanism 206B, wire shaped target 208B for ablation, suspension liquid 212B, container 214B, stirring bar 216B, generated PMNPs 218B, optical window 220B, O-ring seal 222B, inlet 226B, outlet 228B, conductivity adjustment system 230B, conductivity monitoring devices 232B, 234B, and controller 236B. The difference between the embodiments of FIG. 2A and FIG. 2B is that in FIG. 2A, target 208 may be replaced by wire shaped target 208B. Wire shaped target 208B may feed into container 214B so that the head of wire shaped target 208 is maintained in the focal volume of laser beam 202B. Thus, laser based system 201 does not include a motion stage. In one exemplary embodiment, wire shaped target 208B is a piece of gold wire.

Figure 5A:
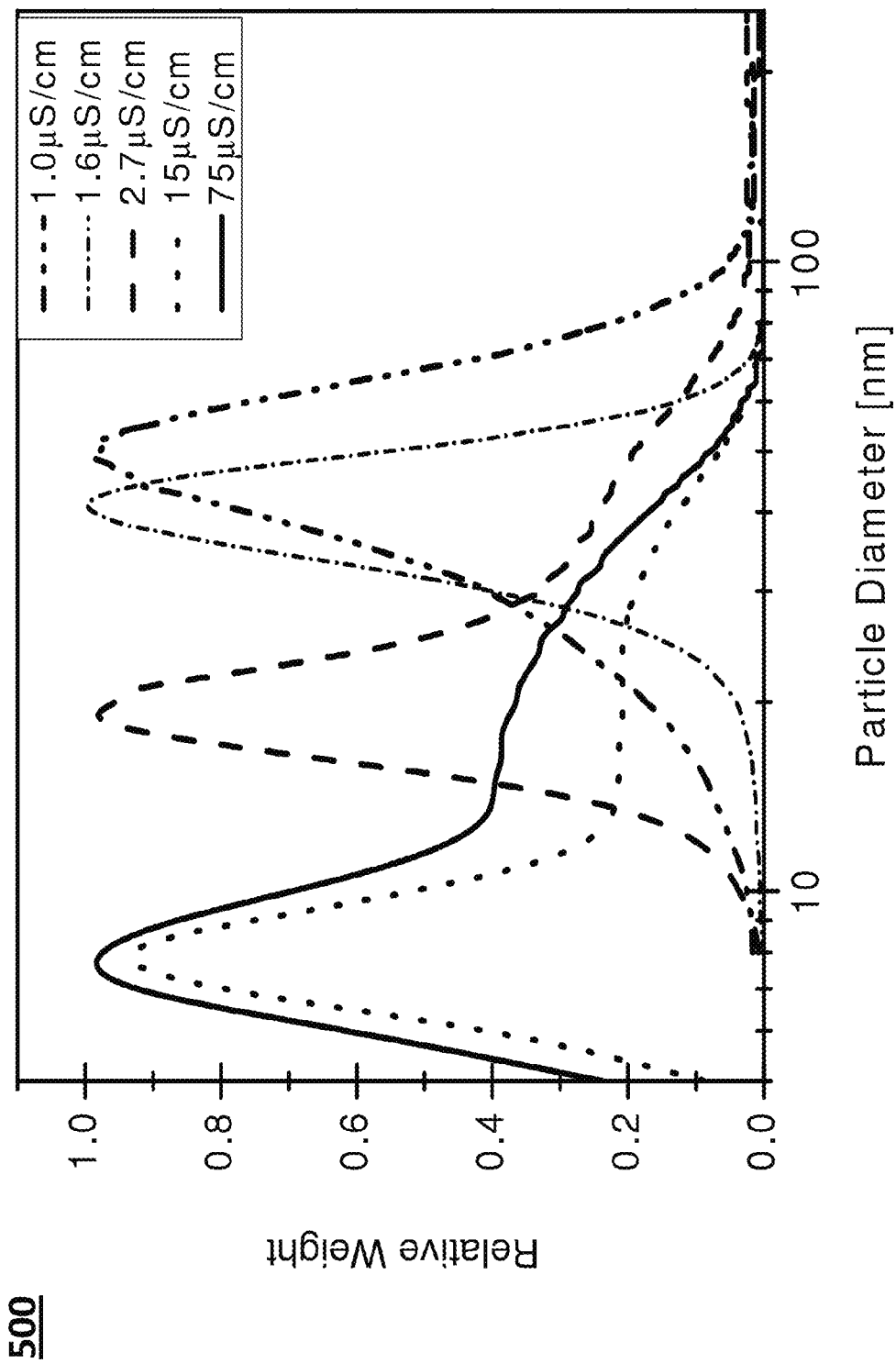
FIG. 5A shows normalized plots of the particle size distributions of AuNPs generated by the PLAL method with different electrical conductivities of the dispersion medium in accordance with exemplary embodiments of the present invention.

FIG. 5A is the evolution of particle size distribution of AuNPs generated by the PLAL method with various levels of electric conductivity in the electrolyte solution in accordance with exemplary embodiments of the present invention. The levels of electrical conductivity ranged from 1.0 µS/cm to 75 µS/cm and one can see that the electrical conductivity dramatically effects particle size distribution. The method of analytical ultracentrifugation, for example, using CPS Disk CentrifugeDC24000 UHR from CPS Instruments, Inc. of Prairieville, La. is applied to measure the size distributions of AuNPs. The size distributions were obtained based on the weight distribution of the AuNPs. A weight distribution is a distribution of the product of the number of particles and the mass of a particle at the size. The normalized distributions in FIG. 5A show relative population density (number/volume) of the AnNPs made in the different electrical conductivity electrolyte suspension mediums.

Figure 5B:
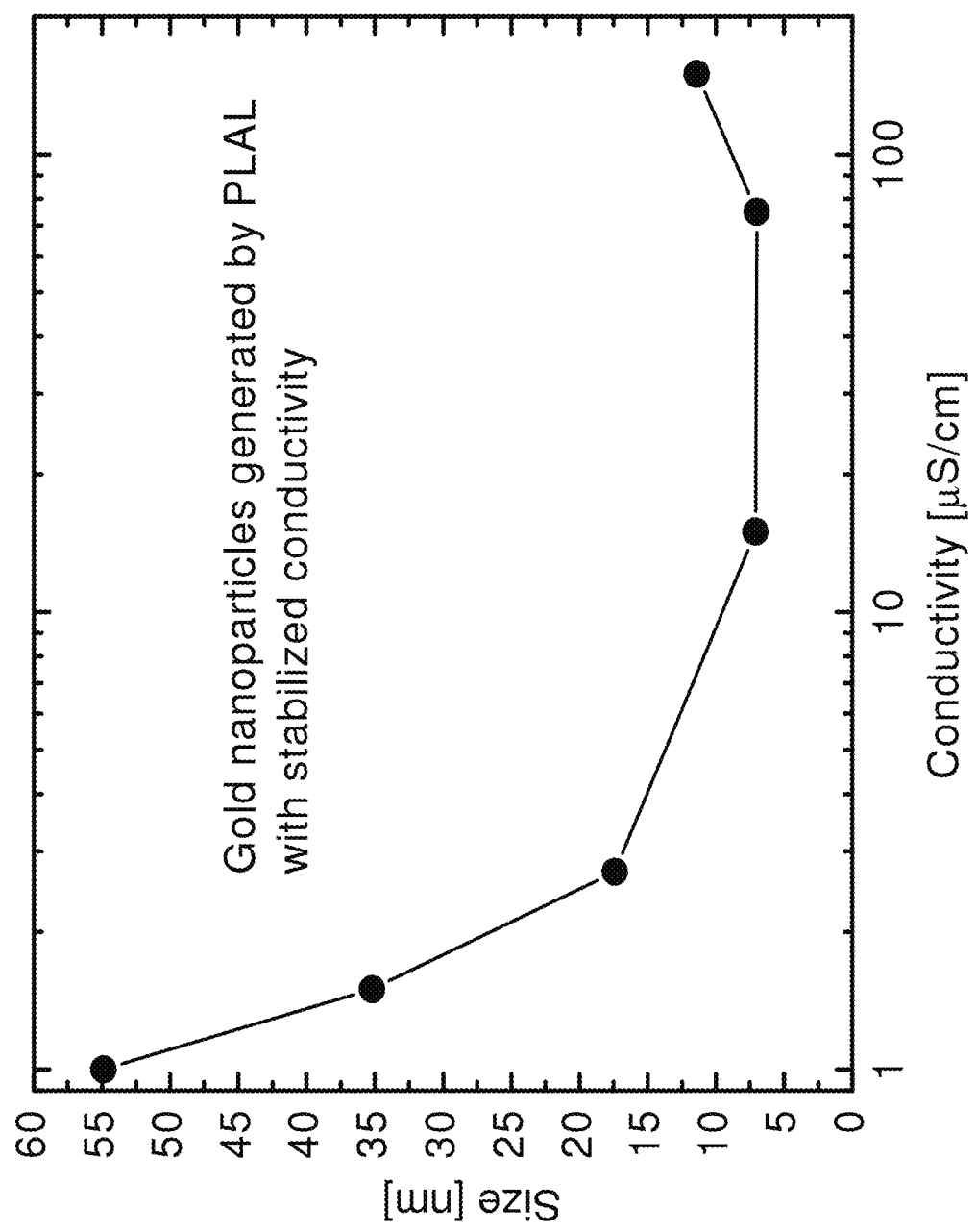
FIG. 5B is a plot of the normalized size peak in the size distribution of AuNPs generated by the PLAL method in different conductivity electrolytes in accordance with exemplary embodiments of the present invention.

FIG. 5B is a plot of the size peak in the size distribution of AuNPs generated by the PLAL method in different electrical conductivity electrolyte suspension mediums. It is possible to produce 35 nm or larger particle sizes, with preferred particle sizes in the range from about 10 nm to about 60 nm of the AuNPs when the electrical conductivity in the electrolyte suspension medium is properly stabilized as shown. C. Rehbock et al. reported the largest size of about 32 nm is made in a 1 µM NaCl solution when the electrical conductivity is presumably lower than at least 0.5 µS/cm. However, the present invention indicates that 35 nm AuNPs may be made in an electrolyte solution having a conductivity of 1.6 µS/cm as shown in FIG. 5B. As a consequence, a presence of an excessive amount of ions in the electrolyte solution is suggested, which is causing a much higher conductivity of the electrolyte solution than that estimated from the known amount of NaCl. This is in direct contrast to the teaching of Rehbock et al. regarding ion concentration and particle size when the total ion concentration is properly estimated through the electrical conductivity as disclosed in the present specification.

In FIG. 5C, the size peak is plotted versus the electric conductivity of the suspension medium in a linear scale. FIG. 5C emphasizes how critically important it is to stabilize the electric conductivity in the dispersion media for PLAL to produce the desired particle sizes. The shaded area 550 in FIG. 5C is a region required for making AuNPs with the peak size 10 nm or larger. The slope of conductivity dependence becomes steeper and steeper as the targeted size of AuNP becomes larger. The absolute value of the slope changes from about 0.83 (nm)/(µS/cm) to about 33 (nm)/(µS/cm) in the shaded area 550.

The result confirms that measuring and maintaining the total ion concentration in the electrolyte solution via the electric conductivity is a very important step to ensure the size of PMNPs produced by PLAL.

Figure 5D:
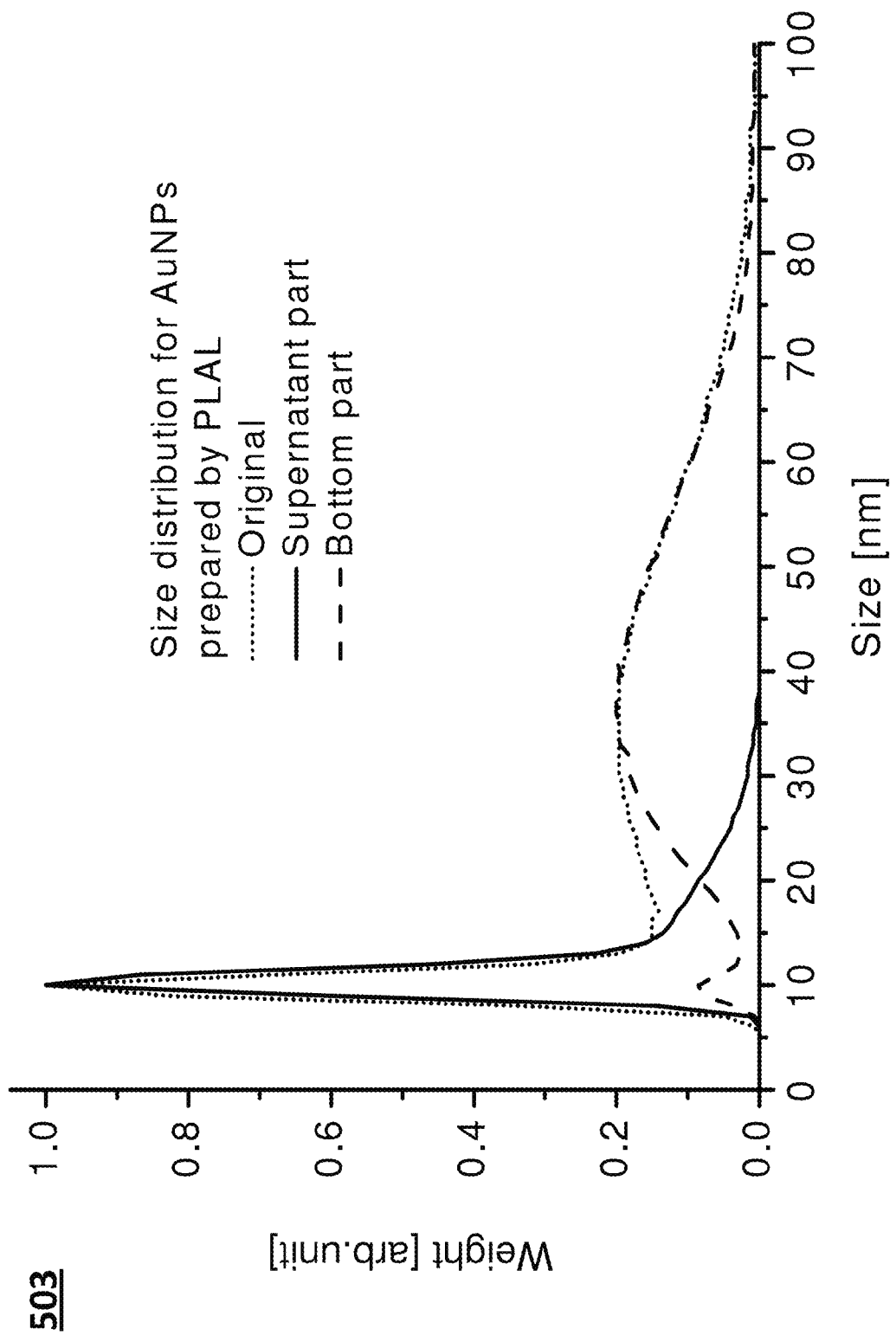
FIG. 5D shows the size distribution obtained before and after the size refinement step by centrifugation according to the present invention.

At step 308, a size distribution of the generated PMNPs or PMNCs is refined. Although the PLAL in a conductivity stabilized electrolyte produces the size distribution with an accurately controlled size peak, the size distribution may still contain a sub peak or a shoulder structure. To remove these particles having an undesirable size, for example, a centrifugal field may be applied. For removal of the larger sized particles, the supernatant part may be taken from a centrifuged PMNC. For removal of the smaller sized particles, the pellet part may be taken from the centrifuged PMNC and then the pellet part may be redispersed by adding an electrolyte solution or deionized water. FIG. 5D shows data for the size distribution refined by centrifuge methods. The original distribution of AuNPs is plotted in the short dotted line. One clearly sees there are at least two populations of particle sizes. A first sharp peak at about 10 nm and then a broad shoulder ranging from about 15 nm to about 75 nm The solid line indicates the size distribution in the removed supernatant after centrifugation at 500 G for 60 min. The data clearly shows that the smaller sized particles of 5 to 15 nm with a small tail of 15 to 30 nm sized particles stays in the supernatant. The dashed line shows the particle size distribution in the pellet after resuspension in the dispersion medium. One can see a small number of particles in the 7 to 12 nm range with the majority of the particles being in the 15 to 75 nm range. In this exemplified way, the size distribution can be refined by separating the distribution into at least two size distribution populations using centrifugal force.

At step 310, the generated PMNCs are stored in a container under a proper storage condition before being used for applications such as SERS. The PMNCs generated by PLAL according to the present invention have an electrical conductivity below 20 µS/cm, mostly in the range from 1 µS/cm to 10 µS/cm. However, as shown in FIG. 4, the conductivity continues to increase with time when the PMNCs are stored in the container. The rate of increase is in part determined by the chemical nature of the container.

The material of the container in contact with the generated PMNC preferably will be a polymer or plastic such as polycarbonate, polyethylene, polyethylene terephtalate, polyethylene terephtalate glycol-modified and polystyrene. The results from FIG. 4 suggest that borosilicate based glass, and perhaps all glass containers should be avoided for storage containers. The electrical conductivity changed the least over time in a plastic container versus various glass containers.

Dissolved gas can influence the resultant conductivity of the colloidal solution, therefore the container may be a purged and sealed under inert gas such as nitrogen or a noble gas including, helium, neon, argon and krypton atmosphere.

Regarding a storage temperature, the PMNCs may be maintained at lower than 40° C., preferably at lower than 25° C. as in a refrigerator.

Regarding a storage environment, exposure to the sunlight must be avoided. Preferably, the container with the PMNCs is maintained in a dark place or an amber colored container must be used.

In order to keep conductivity lower than 25 µS/cm for about 4 months after generation, the rate of conductivity increase is required to be 1.5 µS/cm or smaller per week, preferably 1 µS/cm or smaller per week, and the most preferably 0.5 µS/cm or smaller per week. Thus, an electrical conductivity of the colloidal suspension will preferably be less than 25 µS/cm, and may be in the range from about 1 µS/cm-22 µS/cm, or about 1.5 µS/cm-15 µS/cm. As to changes in conductivity, an increase of the electric conductivity of a stored colloidal suspension in the container will preferably less than 1.5 µS/cm per week, less than 1 µS/cm per week, or less than 0.5 µS/cm per week.

A surprising advantageous effect of the present invention is that PMNPs produced with various embodiments can be utilized to further increase the average size, which occurs when the conductivity in the PMNCs decreases. The ability to control size increase is not only a property by which the PMNCs prepared via the present invention can be recognized, but also a useful function one can utilize to increase the yield of, for example, about 15 nm or larger PMNPs. To obtain a specific size range from a given wide size distribution, size distribution refinement by centrifuge as shown in FIG. 5D may be applied. However, the centrifuge method is, in principle, a size filtering process, which usually causes a large loss of PMNPs and results in low yield. In contrast, decreasing the conductivity in the PMNC such as by dilution with deionize water or highly-diluted electrolyte solution or, in some embodiments, by dialysis can shift the size peak to larger sized particles, which may achieve 100% yield. A minimum threshold value of the conductivity below which the the size increase occurs may be 20 µS/cm or smaller, 10 µS/cm or smaller, or 5 µS/cm or smaller.

Figure 6:
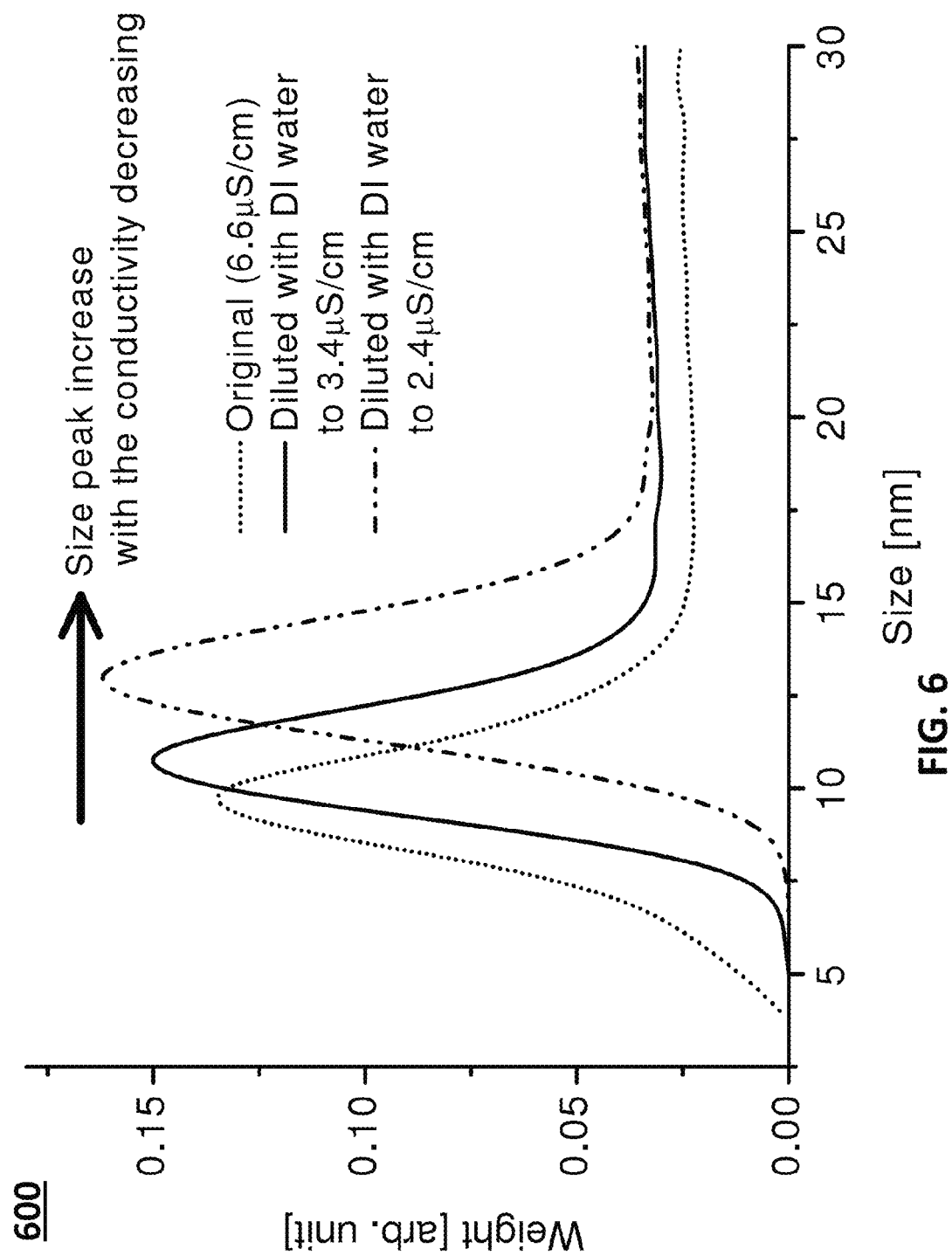
FIG. 6 shows the effect of lowering electrical conductivity in the PMNCs on the size distribution of the PMNPs.

FIG. 6 shows an effect of lowering conductivity in the PMNC on the size distribution of the PMNPs. AuNCs having an initial conductivity of 6.6 µS/cm were prepared by the PLAL method. They had a peak size of about 10 nm The particles were diluted with deionized water to decrease the conductivity down to 3.4 µS/cm and the size peak shifted up to about 11 nm The particles were further diluted to a conductivity of 2.4 µS/cm and the peak was raised to over 12.5 nm As the conductivity decreases, the size peak shifts to the larger average sizes, which is particularly advantageous for the various applications described below such as SERS. One can see from this data and that shown in FIG. 5C the idea of a threshold for the electrical conductance, when the electrical conductance is below this threshold then the size of the nanoparticles can be dramatically increased by the lower electrical conductance. Although understanding the exact mechanism is not necessary to execute the modification of the population size, the inventors hypothesize that the size increase triggered by the conductivity decrease is due to coalescence of the particles via a transient aggregation state. This means that the aggregation happens initially right after the decrease in conductivity, but then the aggregation turns to a coalescence of the particles which is stable and which behaves like a single particle.

Another advantageous effect of the present invention, and determined from the inventors experiments, is an increased long-term stability of the colloids owing to the well-controlled and suppressed increase of electrical conductivity. Even though the initial electrolyte concentration is very small when prepared, the colloidal system becomes unstable with time during storage because the relevant ions continue to come out from the surface of the container into the colloidal suspension. As demonstrated in FIG. 4, time evolution of the externally introduced electrolyte amount can be estimated by monitoring conductivity and it can be predetermined Spectroscopic application of the PMNCs prepared according to the present invention includes, but is not limited to, surface enhanced resonance Raman spectroscopy (SERRS), surface enhanced hyper-Raman spectroscopy (SEHRS) or surface enhanced coherent anti-Stokes Raman spectroscopy (SECARS). For these spectroscopic applications, the physical form of the PMNCs may be a colloidal suspension as shown in FIG. 7A or the cast film of PMNPs made from the PMNC solution by evaporation of the suspension liquid as shown in FIG. 7B.

In FIG. 7A, the PMNC 711 is mixed with the solution containing an analyte 712 of interest. The mixed solution is placed in an optically transparent container 715 such as quartz cuvette through which excitation light 713 having at least one wavelength is irradiated to generate Raman scattering. The scattered light 714 may be collected by a lens 719 and delivered via a suitable guiding optical system to a spectrometer 720 which measures a part of or the whole spectrum in the scattered light where the Raman signals 750 of interest exist. The analyte binding to the PMNCs causes the enhanced signal. The guiding optical system may have one or more optical filters to reduce the signal from the excitation light. The source of the excitation light 713 can be a continuous wave or pulsed laser, or a lamp such as a halogen lamp.

FIG. 7B shows another arrangement for Raman spectroscopy where the cast film of the PMNC mixed with an analyte is used. The two solutions are mixed in the same way as shown in FIG. 7A, and the mixture is dropped onto a substrate 716 such as a slide glass to form a cast film 718 containing PMNPs with the analyte. A material of the substrate may be chosen such that the Raman signal from the substrate does not interfere in the measurement for the analyte. To perform spectroscopy for the cast film on the substrate, for example, a microscope Raman system with objective 718 can be utilized.

Other beneficial applications are to use the PMNP as an imaging agent such as that for optical microscopic imaging and microscopic Raman imaging including the above family of the surface enhanced Raman methods.

FIG. 8 illustrates an exemplary application of PMNPs as an imaging agent for a microscope imaging. For example, the PMNPs 805 in PMNC 803 are added to a cell culture environment where cell 815 is grown. The cell 815 is incubated with PMNPs 805 for a while from a couple hours to a few days, and then, maybe with the container or dish used as a cell culture environment, viewed under an optical microscope. The PMNPs 805 may be localized inside or around the cell, or may be localized into a specific part of cell such as nucleus 817, resulting in visualization of the shape of cell. The surface of PMNPs 805 may be functionalized with molecules such as a targeting ligand so that the PMNPs 805 specifically bind to the cellular portion or part of interest.

For the applications of PMNPs described above the optical properties originating from the localized surface plasmon resonance of the PMNP are utilized.

The PMNCs can also be used in imaging applications such as radiological imaging via x-ray wherein the advantage of a PMNP having a large cross section is utilized. The larger the PMNPs are, the larger their cross-section, which may also improve contrast in a radiogram.

FIG. 9 illustrates an exemplary application of PMNPs as a contrast agent for radiological imaging. The PMNPs 901 are injected into a subject 920 which has a tumor 950 inside the body. The surface of PMNPs 901 is functionalized with one or more ligand molecules to target the tumor which the PMNPs 901 are designed to be delivered to. After an incubation time sufficiently long for the PMNPs 901 to be localized around the tumor 950, a radiogram of the subject 920 is taken using X-rays 910 to visualize the location of the tumor 950. The PMNPs enhance the contrast in the X-ray image.

Immunochromatographic methods such as lateral flow immunochromatographic assays as are being used in commercially-available easy pregnancy test kits is another promising application for the PMNPs because the large particle size enhances sensitivity as reported on AuNPs by S. Lou et al. in "A gold nanoparticle-based immunochromatographic assay: The influence of nanoparticulate size" *Analyst*, 2012, 137, 1174-1181. Precious metal nanoparticles obtained from a colloidal suspension as described herein may be utilized in at least one embodiment of a system for immunochromatography as an alternative to chemically made precious metal nanoparticles.

To utilize the optical property of PMNPs, precise size control of the PMNPs is implemented in various preferred embodiments because the optical properties vary sensitively with the size of PMNPs. For Raman spectroscopy is desirable to provide a large cross section for the radiation interaction with the material under test. Thus, increasing the relative population density (particles/volume) of larger nanoparticles, for example nanoparticles having a maximum diameter of about 15-75 nm, is beneficial. However, it becomes more challenging for PLAL to control size as the required size becomes larger because of the extremely steep slope, as shown in the shaded area 550 in FIG. 5C.

The size of PMNPs can be adjusted by the known amount of electrolyte introduced into the liquid prior to performing PLAL. However, when a highly-diluted electrolyte solution is required to produce 10 nm or larger, in particular, 20 nm or larger PMNPs, a trace amount of unexpectedly introduced electrolytes such as contamination is no longer negligible in terms of its effect on particle size. Embodiments of present invention reduce the uncertainty of the outcome size, which is due to the uncertainty of the amount of unexpectedly introduced electrolytes, while also increasing yield for Raman applications. In other words, without knowing how to measure the total ion concentration in dispersion media, represented by electric conductivity according to the invention, such a drastic dependence of size on the total ion concentration would not have been predicted.

In at least one embodiment, the present invention is a method of making a colloidal suspension of precious metal nanoparticles, the method comprising the steps of: a) providing a target material comprising a precious metal in contact with a liquid dispersion medium having an electrical conductivity within a predetermined conductivity range, the target material and the dispersion medium in contact with an ablation container; b) generating a plurality of precious metal nanoparticles by delivering laser pulses to said target material in said ablation container; c) prior to or while generating said plurality of precious metal nanoparticles monitoring and optionally adjusting said electric conductivity of said dispersion medium to maintain said electric conductivity of said dispersion medium in said predetermined conductivity range, wherein said predetermined conductivity range results in said precious metal nanoparticles having a predetermined size range; and d) forming a colloidal suspension of the precious metal nanoparticles.

In at least one embodiment the method comprises the further steps of: generating a plurality of populations of nanoparticles of a precious metal, each population being generated in a dispersion medium having a different maintained electrical conductivity; collecting each population and measuring the particle size and population density distribution of the nanoparticles in each population to determine a series of data points comprising a normalized peak nanoparticle size at each electrical conductivity; graphing the peak nanoparticle size versus the electrical conductivity and plotting a line joining the data points, the line having a slope of (particle size in nm)/($\mu$S/cm) thereby permitting selection of said predetermined conductivity range to achieve said predetermined size range.

In at least one embodiment the method comprises the further step of selecting the predetermined conductivity range from a portion of the line having an absolute value of the slope of about 0.83 (nm)/($\mu$S/cm) or larger.

In at least one embodiment the method comprises the further step of selecting the predetermined conductivity range from a portion of the line having an absolute value of the slope of about 33 (nm)/($\mu$S/cm) or larger.

In at least one embodiment the method comprises the further step of applying centrifugal force to the colloidal suspension to separate the nanoparticles into a supernatant portion and a pellet portion thereby permitting a narrowing of the predetermined size range.

In at least one embodiment the step of monitoring the electric conductivity is executed by one or more electric conductivity monitoring devices.

In at least one embodiment the steps of monitoring and optionally adjusting the electric conductivity of the dispersion medium is executed by an electric conductivity adjustment system placed in an upstream location of the ablation container near an inlet of the ablation container.

In at least one embodiment the electric conductivity adjustment system comprises one or more conductivity monitoring devices placed in the dispersion medium, a first one being placed at the inlet of the ablation container and a second one being placed in the ablation container near the inlet where no precious metal nanoparticles are generated.

In at least one embodiment the conductivity adjustment system is controlled by a controller that receives feedback data from the first and the second conductivity monitoring devices so that the predetermined conductivity is stabilized in the dispersion medium before or during generation of the precious metal nanoparticles.

In at least one embodiment the step of generating precious metal nanoparticles includes irradiating the target material with a pulsed-laser-ablation beam and forming a plurality of nanoparticles of the precious metal, the nanoparticles having a predetermined size range within the range of from about 1 nm to 1000 nm In at least one embodiment the nanoparticles have a predetermined size range within a range of about 5 to 150 nm In at least one embodiment the nanoparticles have a predetermined size range within a range of about 10 to 100 nm In at least one embodiment the electric conductivity in the dispersion medium is adjusted to a predetermined conductivity range of 25 µS/cm or less.

In at least one embodiment the electric conductivity in the dispersion medium is adjusted to a predetermined conductivity range in the range from 1 µS/cm to 10 µS/cm.

In at least one embodiment the electric conductivity in the dispersion medium is adjusted to a predetermined conductivity range in the range from 1.5 µS/cm to 8 µS/cm.

In at least one embodiment the laser pulses have a repetition rate in a range of from 1 kHz to 100 MHz.

In at least one embodiment the laser pulses have a pulse energy in a range of from 10 nJ to 2 mJ.

In at least one embodiment the laser pulses have a center of wavelength at an ultraviolet, visible, or near infrared wavelength.

In at least one embodiment the laser pulses have a pulse duration in a range of from 100 fs to 10 ns.

In at least one embodiment the laser pulses have a pulse duration in a range of from 100 fs to 10 ps.

In at least one embodiment the dispersion medium flows from an inlet to an outlet of the ablation container.

In at least one embodiment the colloidal suspension has an electrical conductivity of greater than 1 µS/cm and less than 22 µS/cm.

In at least one embodiment the colloidal suspension has an electrical conductivity of greater than 1.5 µS/cm and less than 15 µS/cm.

In at least one embodiment the colloidal suspension is placed in a storage container, wherein an increase of an electric conductivity of the colloidal suspension in the container is less than 1.5 µS/cm per week.

In at least one embodiment the colloidal suspension is placed in a storage container, wherein an increase of an electric conductivity of the colloidal suspension in the container is less than 1 µS/cm per week.

In at least one embodiment the colloidal suspension is placed in a storage container, wherein an increase of an electric conductivity of the colloidal suspension in the container is less than 0.5 µS/cm per week.

In at least one embodiment the precious metal is selected from the group consisting of gold, silver, copper, platinum, palladium, rhodium, ruthenium, iridium, osmium, or an alloy including at least one of the precious metals.

In at least one embodiment the precious metal is a Group 11 element.

In at least one embodiment the dispersion medium comprises an electrolyte that is an inorganic or organic salt including at least one anion or cation.

In at least one embodiment the at least one anion or cation includes at least one element selected from the group consisting of Group 1 elements in the Periodic Table, Group 2 elements in the Periodic Table, Group 15 elements in the Periodic Table, Group 16 elements in the Periodic Table, Group 17 elements in the Periodic Table, and an organic acid function.

In at least one embodiment a concentration of the precious metal nanoparticles in the colloidal suspension is more than 0.01 nM.

In at least one embodiment the present invention is a colloidal suspension comprising; a plurality of precious metal nanoparticles having a concentration of more than 0.01 nM in a liquid including electrolyte; wherein the colloidal suspension exhibits an increase in the average size of the precious metal nanoparticles with a decrease in an electrical conductivity of the colloidal suspension below a threshold value.

In at least one embodiment the threshold value of the electrical conductivity required for the average size of the precious metal nanoparticles to increase is 20 µS/cm or less.

In at least one embodiment the threshold value of the electrical conductivity required for the average size of the precious metal nanoparticles to increase is 10 µS/cm or less.

In at least one embodiment the threshold value of the electrical conductivity required for the average size of the precious metal nanoparticles to increase is 5 µS/cm or less.

In at least one embodiment an average size of the precious metal nanoparticles is about 10 nm or larger.

In at least one embodiment an average size of the precious metal nanoparticles is about 15 nm or larger.

In at least one embodiment an average size of said precious metal nanoparticles is about 20 nm or larger.

In at least one embodiment a spectroscopy system comprises a colloidal suspension of precious metal nanoparticles having a concentration of more than 0.01 nM in a liquid including electrolyte; wherein the colloidal suspension exhibits an increase in the average size of the precious metal nanoparticles with a decrease in an electrical conductivity of the colloidal suspension below a threshold value In at least one embodiment the spectroscopy system is configured for Raman spectroscopy.

In at least one embodiment the Raman spectroscopy comprises: surface enhanced Raman spectroscopy (SERS), surface enhanced resonance Raman spectroscopy (SERRS), surface enhanced hyper-Raman spectroscopy (SEHRS) or surface enhanced coherent anti-Stokes Raman spectroscopy (SECARS).

In at least one embodiment the invention comprises a spectroscopy system comprising a cast film disposed on a substrate, the cast film comprising precious metal nanoparticles obtained from a mixture of an analyte with a colloidal suspension comprising; a plurality of precious metal nanoparticles having a concentration of more than 0.01 nM in a liquid including electrolyte; wherein the colloidal suspension exhibits an increase in the average size of the precious metal nanoparticles with a decrease in an electrical conductivity of the colloidal suspension below a threshold value.

In at least one embodiment the spectroscopy system is configured for Raman spectroscopy.

In at least one embodiment the Raman spectroscopy comprises: surface enhanced Raman spectroscopy (SERS), surface enhanced resonance Raman spectroscopy (SERRS), surface enhanced hyper-Raman spectroscopy (SEHRS) or surface enhanced coherent anti-Stokes Raman spectroscopy (SECARS).

In at least one embodiment the present invention is an apparatus for immunochomatographic assay, comprising precious metal nanoparticles obtained from a colloidal suspension comprising; a plurality of precious metal nanoparticles having a concentration of more than 0.01 nM in a liquid including electrolyte; wherein the colloidal suspension exhibits an increase in the average size of the precious metal nanoparticles with a decrease in an electrical conductivity of the colloidal suspension below a threshold value.

In at least one embodiment the present invention is an imaging agent comprising precious metal nanoparticles obtained from a colloidal suspension comprising; a plurality of precious metal nanoparticles having a concentration of more than 0.01 nM in a liquid including electrolyte; wherein the colloidal suspension exhibits an increase in the average size of the precious metal nanoparticles with a decrease in an electrical conductivity of the colloidal suspension below a threshold value mixed with an analyte.

In at least one embodiment the imaging agent is for optical imaging.

In at least one embodiment the imaging agent is for radiological imaging.

In at least one embodiment the imaging agent is for biological imaging.

In at least one embodiment the colloidal suspension exhibits an increase in the average size of the precious metal nanoparticles therein as the electrical conductivity of the colloidal suspension is decreased from an initial value by an amount of 20 µS/cm or less.

In at least one embodiment the colloidal suspension exhibits an increase in the average size of the precious metal nanoparticles therein as the electrical conductivity of the colloidal suspension is decreased from an initial value by an amount of 10 µS/cm or less.

In at least one embodiment the colloidal suspension exhibits an increase in the average size of the precious metal nanoparticles therein as the electrical conductivity of the colloidal suspension is decreased from an initial value by an amount of 5 µS/cm or less.

In at least one embodiment the present invention is a method of changing the population of nanoparticles of a precious metal in a colloidal suspension such that the average size of said precious metal nanoparticles increases, the method comprising the steps of: a) receiving a colloidal suspension having an initial electrical conductivity; b) decreasing the electrical conductivity of the colloidal suspension from said initial value.

In at least one embodiment step b) of the method comprises a centrifugal purification or dialysis of the colloidal suspension.

In at least one embodiment the decrease of the electrical conductivity in step b) is 20 µS/cm or less.

In at least one embodiment the decrease of the electrical conductivity in step b) is 10 µS/cm or less.

In at least one embodiment the decrease of the electrical conductivity in step b) is 5 µS/cm or less.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

Thus, while only certain embodiments have been specifically described herein, it will be apparent that numerous modifications may be made thereto without departing from the spirit and scope of the invention. It is to be understood that the arrangements are not mutually exclusive. Elements may be combined among embodiments in suitable ways to accomplish desired design objectives. Further, acronyms are used merely to enhance the readability of the specification and claims. It should be noted that these acronyms are not intended to lessen the generality of the terms used and they should not be construed to restrict the scope of the claims to the embodiments described therein.

We claim:

1. A colloidal suspension comprising;
   precious metal nanoparticles selected from the group consisting of gold, silver, copper, platinum, palladium, rhodium, ruthenium, iridium, osmium, and an alloy including at least one of said precious metals, said nanoparticles having an initial average diameter of at least 10 nm or larger at an initial electrical conductivity of said suspension with said precious metal nanoparticles being present in said suspension at a concentration of more than 0.01 nM, said suspension further comprising an electrolyte, said electrolyte being an anion or cation formed from an organic acid function or at least one Periodic Table element selected from the group consisting of group 1 elements, group 2 elements, group 15 elements, group 16 elements, group 17 elements and mixtures thereof; and
   wherein said electrolyte is present in an amount sufficient to make said initial electrical conductivity of said suspension have a value of from 1µS/cm to 22µS/cm and wherein an average diameter of said precious metal nanoparticles increases from said initial average diameter as an electrical conductivity of said suspension is decreased from said initial electrical conductivity to a lower electrical conductivity.

2. A colloidal suspension as recited in claim 1, wherein said colloidal suspension has an initial electrical conductivity of 20µS/cm.

3. A colloidal suspension as recited in claim 1, wherein said colloidal suspension is placed in a storage container and has an initial electrical conductivity of 20µS/cm or less, and wherein an increase of said electrical conductivity of said colloidal suspension in said container is less than 1.5µS/cm per week over time after being placed in said storage container.

4. A spectroscopy system comprising a colloidal suspension of precious metal nanoparticles according to claim 1.

5. A spectroscopy system comprising a cast film disposed on a substrate, said cast film comprising precious metal nanoparticles obtained from a mixture of an analyte with a colloidal suspension according to claim 1.

6. An apparatus for immunochomatographic assay, comprising precious metal nanoparticles obtained from a colloidal suspension according to claim 1.

7. An imaging agent comprising precious metal nanoparticles obtained from a colloidal suspension according to claim 1 mixed with an analyte.

* * * * *